United States Patent
Kakehashi et al.

(12) 
(10) Patent No.: US 6,192,698 B1
(45) Date of Patent: Feb. 27, 2001

(54) VEHICLE-AIR-CONDITIONING SYSTEM WITH COOLING DEGREE ESTIMATOR FOR LEFT/RIGHT TEMPERATURE CONTROL

(75) Inventors: Nobuharu Kakehashi, Toyoake; Yoshiyuki Ogawa, Iwakura; Katsuhiko Samukawa, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/388,188

(22) Filed: Sep. 1, 1999

Related U.S. Application Data

(63) Continuation-in-part of application No. 09/264,992, filed on Mar. 8, 1999.

(30) Foreign Application Priority Data

Mar. 12, 1998 (JP) .................................................... 10-61535
Sep. 10, 1998 (JP) .................................................. 10-257250

(51) Int. Cl.⁷ ................................................... B60H 1/00
(52) U.S. Cl. .......................... 62/227; 236/1 B; 236/49.3; 165/203; 62/82; 62/282
(58) Field of Search ............................. 62/244, 186, 226, 62/227, 229, 151, 156, 150, 272, 282, 80, 82; 165/202, 203, 204, 205, 217, 42, 43; 236/1 B, 13, 49.1, 49.3

(56) References Cited

U.S. PATENT DOCUMENTS

| | | | | |
|---|---|---|---|---|
| 4,406,397 | * | 9/1983 | Kamata et al. | 236/1 B |
| 5,086,628 | * | 2/1992 | Hashimoto | 165/203 X |
| 5,337,802 | * | 8/1994 | Kajino et al. | 165/204 X |
| 5,725,052 | * | 3/1998 | Kawai et al. | 236/49.3 X |
| 6,019,288 | * | 2/2000 | Arold et al. | 62/244 X |

FOREIGN PATENT DOCUMENTS

| | | |
|---|---|---|
| 2-63216 | 5/1990 | (JP) . |
| 6-247132 | 9/1994 | (JP) . |
| 9-39544 | 2/1997 | (JP) . |

* cited by examiner

*Primary Examiner*—Harry B. Tanner
(74) *Attorney, Agent, or Firm*—Harness, Dickey & Pierce, PLC

(57) ABSTRACT

In an air-conditioning system having two air-conditioning passages serving two different air-conditioning zones but having a cooling degree detector provided in only one of the passages to reduce cost, with the degree to which air is cooled in the other passage being estimated based on a cooling degree detected by the detector and the difference between flows of air passing through the passages or an intake temperature of air entering the passages. On the other hand, when an evaporator is possible to be frosted in one of the passages, air flow amount in the one of the passages is corrected to be increased. Therefore, it can prevent a windshield from being fogged while preventing the evaporator from being frosted.

29 Claims, 14 Drawing Sheets

VEHICLE-AIR-CONDITIONING SYSTEM WITH COOLING DEGREE ESTIMATOR FOR LEFT/RIGHT TEMPERATURE CONTROL

CROSS-REFERENCE TO RELATED APPLICATION

This application is a CIP application of U.S. application Ser. No. 09/264,992, filed on Mar. 8, 1999. The present application is related to Japanese patent applications No. Hei. 10-61535 and No. Hei. 10-257250, the contents of which are incorporated herein by reference.

BACKGROUND OF THE INVENTION

1. Technical Field

This invention relates generally to vehicle air-conditioning systems wherein air flows in first and second passages can be controlled to different values, and particularly to a reduced-cost system in which a cooling degree detector is provided only in the first passage, and in which the degree of cooling taking place in the second passage is estimated.

2. Related Art

As disclosed in Japanese Unexamined Patent Publication No. Hei. 9-39544, air-conditioning systems wherein the inside of an air-conditioner case is partitioned into two passages to form separate driver seat side and passenger seat side passages are well known. In such a system, an evaporator and a heater core extend across both passages. A driver seat side air-mixing door is provided in the driver seat side passage, and a passenger seat side air-mixing door is provided in the passenger seat side passage so that conditioned air temperatures can be separately matched to the preferences of a driver and a passenger.

Also in such a system, a single air-conditioning fan is disposed in a non-partitioned upstream part of the air-conditioner case. Consequently, the air flows passing through the two passages are the same.

In the above-described system, the conditioned air blown to the driver seat side and the passenger seat side is independently temperature-controlled. However, because the conditioned air is blown at the same rate to each side, it is not possible to independently control the air flow rate.

In systems utilizing the above type of independent temperature control scheme, a cooling degree detector for detecting the degree to which air is being cooled by an evaporator is provided on the downstream side of the evaporator. This detector produces a detection signal that is used as air-conditioning control information. However, when as mentioned above air flows in the passages are controlled to different values, at times the flow through a part of the evaporator is large while the flow through the remainder of the evaporator is small, as conditioned air in each of the two separate passages passes through the evaporator.

Consequently, to obtain accurate air-conditioning control information for each of the two passages, a detector must be provided on the downstream side of the evaporator in each of the two passages because the air flow in each passage, as well as the degree to which the air is cooled in each passage, is different.

However, providing a separate detector for each passage increases the number of system parts, labor required to assemble the system, and system cost. On the other hand, in the above-described air-conditioning system, it is difficult to prevent frosting of the evaporator while preventing a windshield from being fogged.

SUMMARY OF THE INVENTION

It is therefore an object of the present invention to provide vehicle air-conditioning system with left/right independent temperature control that has one cooling degree detector in only one of the passages, and that estimates the cooling degree in the other passage.

It is an another object of the present invention to provide a vehicle air-conditioning system which prevents frosting of a cooling heat exchanger while preventing a windshield from being fogged.

To achieve this and other objects, the system of the present invention includes first and second air passages through which conditioned air is blown into first and second air conditioning zones, respectively. A heat exchanger is disposed in both the first and second passages, and cools air passing through it. A cooling degree detector disposed in the first passage detects a first cooling degree in the first passage. A cooling degree estimator then estimates a second cooling degree to which air is cooled in the second passage based on at least a first air flow blown through a first passage and a second air flow blown through the second passage, and the first cooling degree.

Because the degree to which air is cooled by heat exchanger in the second passage is estimated by the estimator, even though the cooling degree detector is only provided in the first passage, it is possible to determine the air cooling degree in the second passage.

Because a separate detector is not required for each passage, the number of system parts, labor required to assemble the system, and system cost are all reduced when compared to conventional dual-passage systems.

According to a further aspect of the present invention, an air-conditioning system includes a housing having first and second passages through which conditioned air is blown into first and second air-conditioning zones of the passenger compartment, respectively, a cooling heat exchanger disposed in both the first and second passages, a flow control member for controlling a flow rate of air in the first and second passages, a first cooling degree detector disposed in the first passage downstream from the cooling heat exchanger for detecting a first cooling degree of air in the first air passage, a second cooling degree detector disposed in the second passage downstream from the cooling heat exchanger for detecting a second cooling degree of air in the second air passage, and a control unit for controlling air blown into the passenger compartment. The control unit controls the flow control member in such a manner that a difference between an air amount passing through the first air passage and an air amount passing through the second air passage becomes smaller when any one of the first cooling degree and the second cooling degree is lower than a predetermined value. Therefore, when the cooling heat exchanger is possible to be frosted in one of the first and second air passages, temperature of air flowing through the other air passage between the first and second air passages is not greatly increased, thereby preventing the windshield from being fogged (or frosted).

Preferably, the control unit reduces cooling capacity of the cooling heat exchanger when any one of the first cooling degree and the second cooling degree is lower than a predetermined value. Therefore, it can prevent the cooling heat exchanger from being frosted while preventing the windshield from being fogged.

More preferably, the control unit controls the flow control member in such a manner that an air amount passing through an air passage where the cooling heat exchanger is possible to be frosted, between the first and second air passages, is corrected to be increased. Alternatively, an air amount passing through the other air passage, between the first and second air passages, is corrected to be decreased. Thus, it can further prevent the windshield from being fogged.

DETAILED DESCRIPTION OF THE PREFERRED EMBODIMENTS (First Preferred Embodiment)

Figure 1:
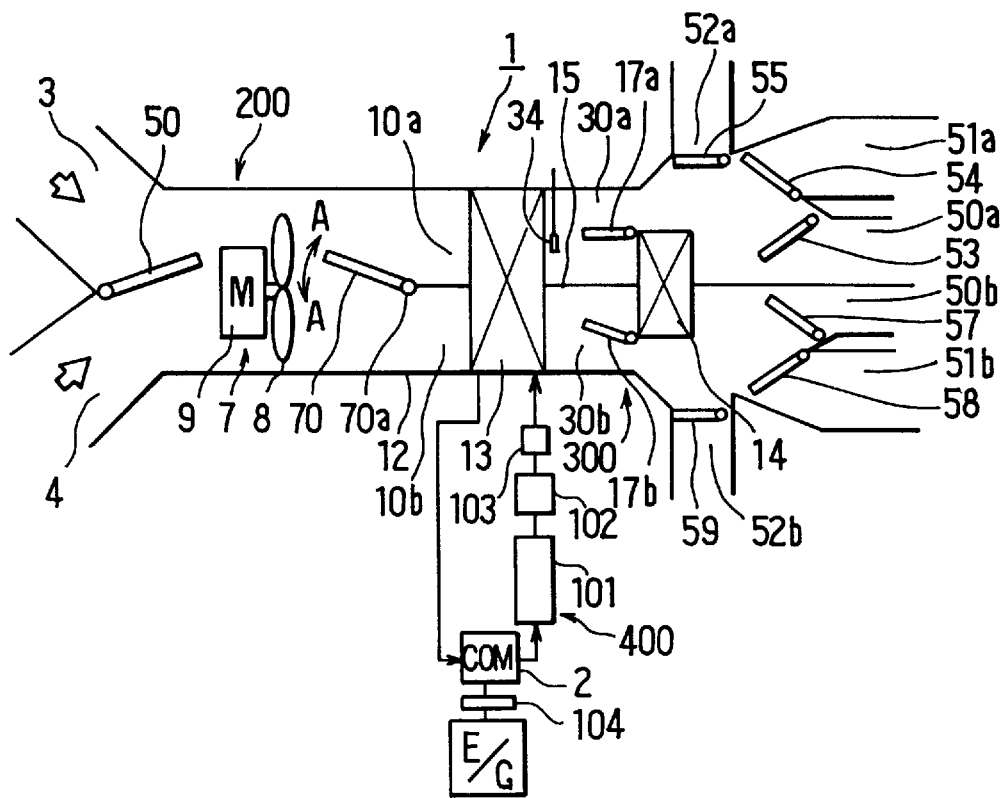
FIG. 1 is a view of the overall construction of a vehicle air-conditioning system according to a first preferred embodiment of the present invention.

A preferred embodiment of the invention of a vehicle air-conditioning system that independently controls temperatures in a driver seat side space (first air-conditioning zone) and a passenger seat side space (second air-conditioning zone) will now be described FIG. 1 shows a ventilation circuit 1 of a vehicle air-conditioning system. The main body of the ventilation circuit 1 is disposed below a dashboard in a vehicle passenger compartment. The air-conditioning system includes an air-conditioner case 12 that forms an air duct leading into the passenger compartment. As shown in FIG. 1, the air-conditioner case 12 is primarily made up of an inside/outside air blower unit 200 and an air-conditioning unit 300.

The inside/outside air blower unit 200 inputs inside air or outside air into the air-conditioner case 12. Ordinary inside air inlet 3 and ordinary outside air inlet 4 are formed in the inside/outside air blower unit 200, and an inside/outside air switching door 50 selectively opens and closes these two inlets. The inside/outside air switching door 50 is driven by a servo motor 90 (see FIG. 2), which enables the inside/outside air blower unit 200 to take in inside air through the inside air inlet 3 or outside air through the outside air inlet 4.

Therefore, in configuration shown in FIG. 1, the ventilation circuit 1 can be switched between an inside air mode wherein only inside air is taken in to the air-conditioner case 12 and an outside air mode wherein only outside air is taken in. The servo motor 90 is controlled by an ECU 30 (FIG. 2), in a manner which will be discussed below in more detail.

A single electric blower 7 is mounted in the inside/outside air blower unit 200 on the downstream side of the inside and outside air inlets 3, 4. This electric blower 7 has a fan 8 and an electric blower motor 9 for driving the fan 8. A blower voltage impressed on the blower motor 9 is controlled by the ECU 30.

An evaporator 13, which is a cooling heat exchanger for cooling air passing through it, is mounted inside the air-conditioning unit 300. The evaporator 13 is part of an ordinary refrigerating cycle 400 together with a compressor 2, a condenser 101, a receiver 102 and a pressure-reducer 103, and dehumidifies and cools air inside the air-conditioner case 12. The compressor 2 is connected to an engine E/G by an electromagnetic clutch 104, and is driven and stopped by engagement and disengagement of the electromagnetic clutch 104. That is, when the electromagnetic clutch 104 is on, power from the engine E/G is transmitted to the compressor 2, and refrigerant is supplied to the evaporator 13. When on the other hand the electromagnetic clutch 104 is off, power from the engine E/G is cut off and the compressor 2 stops, whereupon the supply of refrigerant to the evaporator 13 stops.

A heater core 14 is mounted in the air-conditioning unit 300 on the downstream side of the evaporator 13. The heater core 14 is a heat exchanger for heating having cooling water from the engine E/G as its heat source, and heats air cooled by the evaporator 13.

A partition plate 15 is provided inside the air-conditioning unit 300, extending as shown in FIG. 1 from the upstream side of the evaporator 13 to the downstream end of the air-conditioning unit 300. This partition plate 15 forms two passages 10a, 10b inside the air-conditioning unit 300. The evaporator 13 and the heater core 14 extend across both of these first and second passages 10a, 10b.

The first passage 10a is for delivering conditioned air into a first air-conditioning zone on the driver seat side, and the second passage 10b is for delivering conditioned air into a second air-conditioning zone on the passenger seat side.

Figure 2:
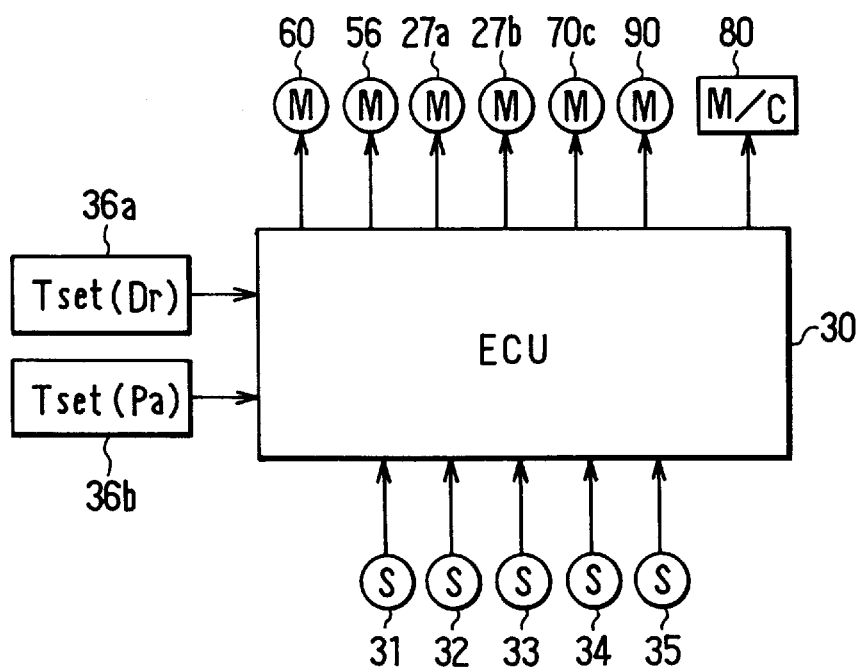
FIG. 2 is a view showing a control system of the first embodiment.

Air-mixing doors 17a, 17b for adjusting the air temperatures in the passages are provided in the first and second passages 10a, 10b respectively, downstream from the evaporator 13 but upstream from the heater core 14 in the air-conditioning unit 300. These air-mixing doors 17a, 17b are driven by respective driving devices, such as servo motors 27a, 27b (FIG. 2).

The air-mixing door 17a adjusts the temperature of the conditioned air from the first passage 10a by adjusting the amount of air heated by the heater core 14 in the first passage 10a. The air-mixing door 17b adjusts the temperature of the conditioned air from the second passage 10b by adjusting the amount of heating of air effected by the heater core 14 in the second passage 10b.

Specifically, a first bypass passage 30a bypassing the heater core 14 is formed in the first passage 10a and a second bypass passage 30b bypassing the heater core 14 is formed in the second passage 10b. The air-mixing doors 17a, 17b adjust the temperatures of the conditioned air blown through the first and second passages 10a, 10b by adjusting the air flow ratio of air passing through the heater core 14 and air flow bypassing the heater core 14.

Driver seat side ports 50a–52a are formed in the first passage 10a on the downstream side of the heater core 14. These ports guide conditioned air having had its temperature adjusted to outlets on the driver seat side of the passenger compartment.

The driver seat side port 50a is for delivering conditioned air to the foot area of a driver, and the driver seat side port 51a is for delivering conditioned air toward the upper body area of the driver. The driver seat side port 52a is for delivering conditioned air toward the inside of a vehicle front windshield (not shown) on the driver seat side.

The driver seat side port 50a is opened and closed by a plate-like first foot door 53, and the driver seat side port 51a is opened and closed by a plate-like first face door 54. The driver seat side port 52a is opened and closed by a plate-like first defroster door 55. The doors 53–55 are driven by a servo motor 56 (see FIG. 2). Therefore, for the first air-conditioning zone, automatic ventilation mode control, which will be further discussed later, can switch among a face mode (FACE), a bi-level mode (B/L), and a foot mode (FOOT).

Explaining these ventilation modes briefly, the face mode is a mode wherein the conditioned air flowing through the first passage 10a is delivered through the driver seat side port 51a only. The bi-level mode is a mode wherein the conditioned air is delivered through the driver seat side ports 51a and 50a only. The foot mode is a mode wherein the conditioned air is delivered through the driver seat side ports 50a and 52a only.

Passenger seat side ports 50b–52b are formed in the second passage 10b on the downstream side of the heater core 14. These ports guide conditioned air having had its temperature adjusted with the aperture of the air-mixing door 17b to outlets on the passenger seat side of the passenger compartment. The outlets 50b–52b and the driver seat side ports 50a–52a are connected by a duct (not shown).

The passenger seat side port 50b is for delivering conditioned air to a passenger foot area, and the passenger seat side port 51b is for delivering conditioned air toward the passenger upper body area. The passenger seat side port 52b is for delivering conditioned air toward the inside of the vehicle front windshield (not shown) on the passenger seat side.

The passenger seat side port 50b is opened and closed by a plate-like second foot door 57, and the passenger seat side port 51b is opened and closed by a plate-like second face door 58. The passenger seat side port 52b is opened and closed by a plate-like second defroster door 59. The doors 57–59 are driven by a servo motor 60 (see FIG. 2). Thus, for a second air-conditioning zone, automatic ventilation mode control, which will be further discussed later, can switch between a face mode (FACE), a bi-level mode (B/L), and a foot mode (FOOT). The face mode is a mode wherein the conditioned air flowing through the second passage 10b is delivered through the passenger seat side port 51b only. The bi-level mode is a mode wherein this conditioned air is delivered through the passenger seat side ports 51b and 50b only. The foot mode is a mode wherein the conditioned air is delivered through the passenger seat side ports 50b, 52b only.

As shown in FIG. 1, a flow control door 70 is mounted downstream from the blower 7 and upstream from the air-mixing doors 17a, 17b, at the upstream end of the partition plate 15. The flow control door 70 distributes conditioned air produced by the blower 7 to the first and second passages 10a, 10b and controls the flow ratio of air entering the first and second passages 10a, 10b.

The flow control door 70 is pivoted in the direction shown by an arrow A by a pivot shaft 70a rotatably mounted on the air-conditioner case 12 and driven by a servo motor 70c (see FIG. 2).

Referring now to FIG. 2, the control unit (ECU) 30, which controls the vehicle air-conditioning system, will now be described.

The control unit 30 is a conventional electronic control unit including an A/D converter and a microcomputer. Signals from various sensors 31–35 are input into the microcomputer after being A/D-converted by the A/D converter.

The microcomputer is a conventional microcomputer having a CPU, ROM, RAM and I/O circuits (not shown), and is supplied with power from a battery (not shown) when an engine ignition switch (not shown) is turned on.

As shown in FIG. 2, air-conditioning environment factor detectors are connected to the control unit 30. Specifically, connected to the control unit 30 are an inside air temperature sensor 31 for detecting the air temperature inside the vehicle; an outside air temperature sensor 32 for detecting the air temperature outside the vehicle; a solar radiation sensor 33 for detecting the amount of solar radiation reaching the inside of the passenger compartment; a post-evaporator sensor 34 for detecting the temperature of air having just passed through the evaporator 13, that is, the degree of air cooling effected in the evaporator 13; and a water temperature sensor 35 for detecting the temperature of cooling water for engine flowing into the heater core 14.

In the presently-described embodiment, as shown in FIG. 1, the post-evaporator sensor 34 is disposed in the first passage 10a, and detects the temperature of air having just passed through the evaporator 13 in the first passage 10a. The solar radiation sensor 33 is a double sensor having a first solar radiation detecting part for detecting a first amount of solar radiation entering the first air-conditioning zone and a second solar radiation detecting part for detecting a second amount of solar radiation entering the second air-conditioning zone.

Also connected to the control unit 30 are a driver seat side temperature setter 36a for setting a set temperature Tset(Dr) for the driver seat side of the passenger compartment, and a passenger seat side temperature setter 36b for setting a set temperature Tset(Pa) for the passenger seat side of the passenger compartment. The driver seat side temperature setter 36a and the passenger seat side temperature setter 36b are mounted on an air-conditioning control panel (not shown) provided in the front of the passenger compartment. Also provided on this control panel are an inside-outside air changeover switch (not shown) for manually switching between the inside and outside air modes and a ventilation mode switch (not shown) for manually switching the ventilation mode, as is well known in the art.

Figure 3:
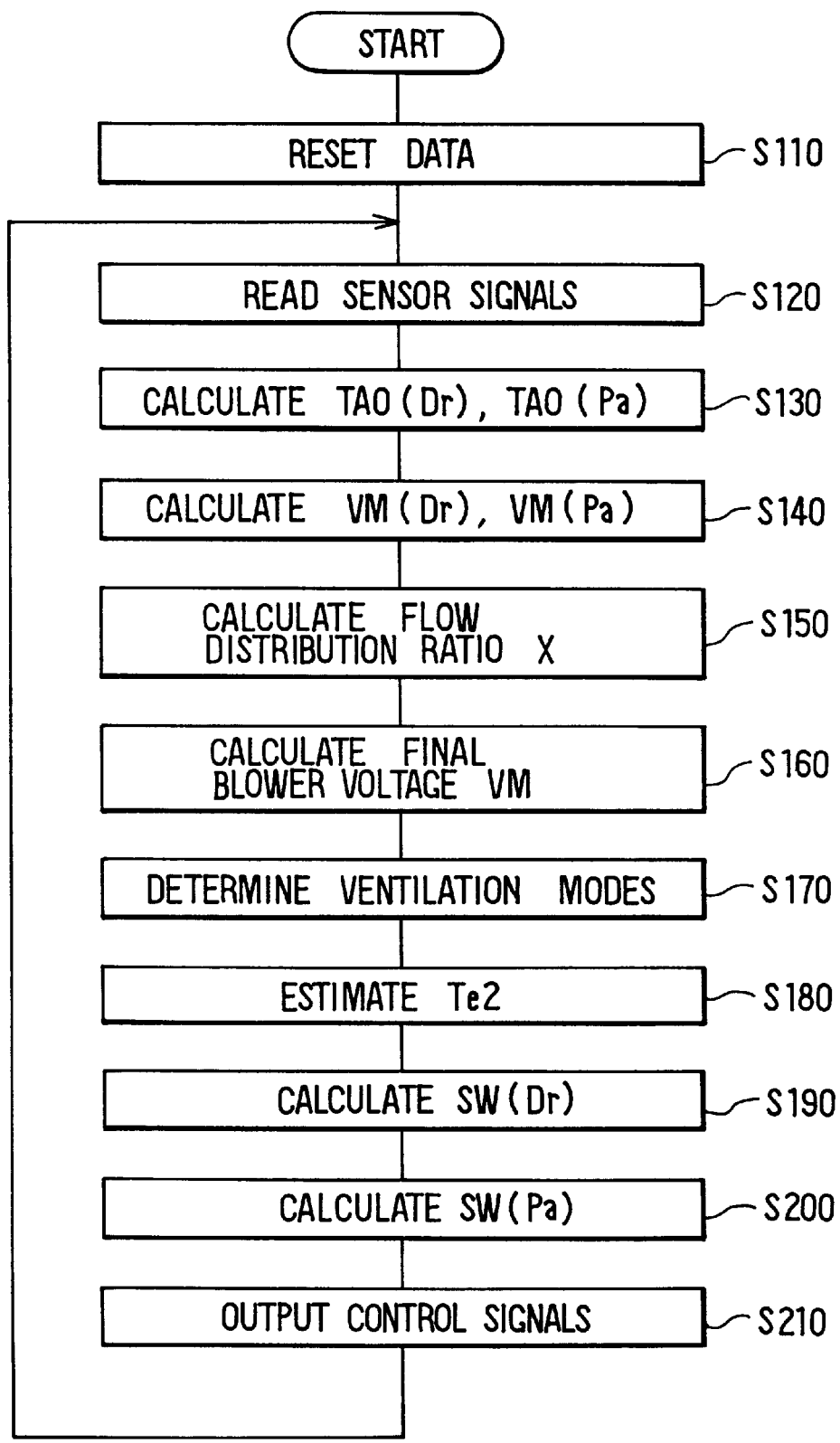
FIG. 3 is a flow diagram showing control methodology for the control system of FIG. 2.

Output terminals of the control unit 30 are connected to the above-mentioned motors 27a, 27b, 56, 60, 70c and 90 and to a clutch circuit 80 for controlling the electromagnetic clutch 104. The operation of this preferred embodiment will now be described in view of the flow diagram of FIG. 3.

First, when automatic control processing of the air-conditioning system is started, data is reset (initialized) at step S110. Then, at step S120, A/D-converted signals (Tr, Tam, Ts(Dr), Ts(Pa), Te1 and Tw) from the sensors 31–35 are read in, as are a set temperature Tset(Dr) set with the driver seat side temperature setter 36a and a set temperature Tset(Pa) set with the passenger seat side temperature setter 36b. Ts(Dr) is the above-mentioned first amount of solar radiation entering the first air-conditioning zone, and Ts(Pa) is the second amount of solar radiation entering the second air-conditioning zone.

At step S130, a target temperature of the conditioned air blown from the first passage 10a, that is, a first target outlet temperature (TAO(Dr)) of the conditioned air blown into the driver seat side space, and a target temperature of the conditioned air blown from the second passage 10b, that is, a second target outlet temperature (TAO(Pa)) of the conditioned air blown into the passenger seat side, are calculated. Specifically, TAO(Dr) and TAO(Pa) are calculated on the basis of the following expressions Exp. 1 and Exp. 2 stored in the above-mentioned ROM.

$$TAO(Dr) = \\ Kset \times Tset(Dr) - Kr \times Tr - Kam \times Tam - Ks \times Ts(Dr) + C$$ Exp. 1

$$TAO(Pa) = \\ Kset \times Tset(Pa) - Kr \times Tr - Kam \times Tam - Ks \times Ts(Pa) + C$$ Exp. 2

(Kset, Kr, Kam and Ks are gains; C is a correction constant)

Figure 4:
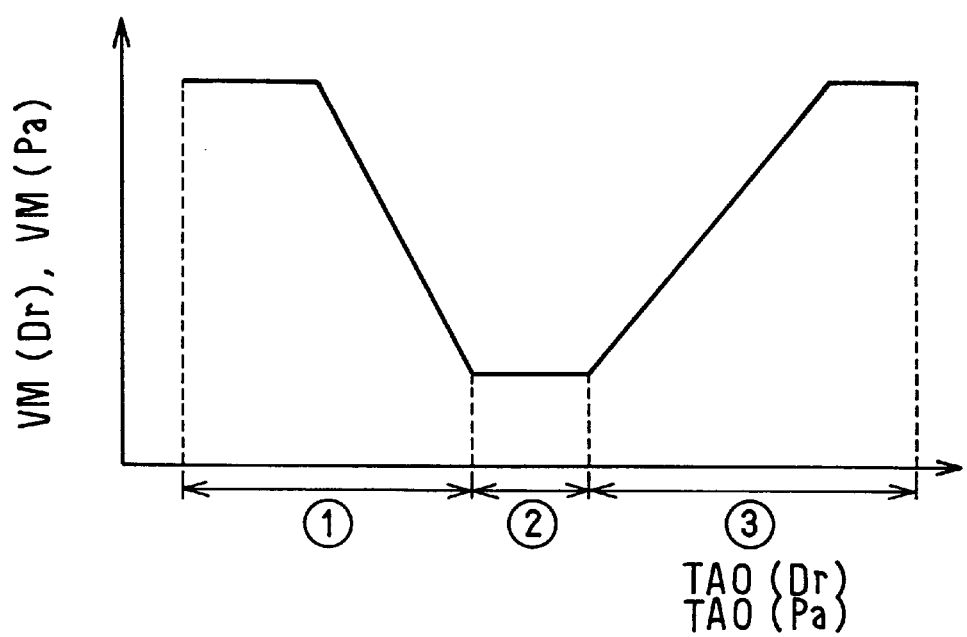
FIG. 4 illustrates a map used to determine blower voltages VM(Dr) and VM(Pa) in the first embodiment.

At step S140, using a characteristic stored in ROM and shown in FIG. 4, from the above-mentioned TAO(Dr) and TAO(Pa), a driver seat side necessary blower voltage VM(Dr) (first target flow), which is a target value of the flow of the conditioned air blown through the first passage 10a, and a passenger seat side necessary blower voltage VM(Pa) (second target flow), which is a target value of the flow of the conditioned air blown through the second passage 10b, are determined.

In FIG. 4, when the target outlet temperatures TAO(Dr) and TAO(Pa) are in the range [1], because the air-conditioning unit cannot produce these target outlet temperatures, the flow is increased to increase the cooling effect. When TAO(Dr) and TAO(Pa) are in the range [2], because the supply of heat to the passenger compartment is to be varied by the outlet temperatures being varied, the flow is made constant. Further, when TAO(Dr) and TAO(Pa) are in the range [3] shown in FIG. 4, because the air-conditioning unit cannot produce these target outlet temperatures, the flow is increased to increase the heating effect. Thus the relationship between TAO and VM is set to a nonlinear relationship.

At step S150, the ratio of the driver seat side necessary blower voltage VM(Dr) to the passenger seat side necessary blower voltage VM(Pa) determined at step S140, in other words the flow ratio (flow distribution ratio X) of the conditioned air in the first passage 10a and the second passage 10b, is determined, and an aperture (operating position) of the flow control door 70 is determined.

At step S160, a final necessary blower voltage VM of the blower motor 9 is calculated so that in accordance with the operating position of the flow control door 70 the flows blown through the first and second passages 10a, 10b become the same as the flows determined at step S140.

As a result, the flows blown through the first and second passages 10a, 10b satisfy respectively required flows proportional to VM(Dr) and VM(Pa), and the respective flows of the conditioned air blown through the first passage 10a and the second passage 10b can thus be controlled to different values. The flow control door 70, the servo motor 70c and the control unit 30 constitute flow controlling means of the present invention.

Figure 5:
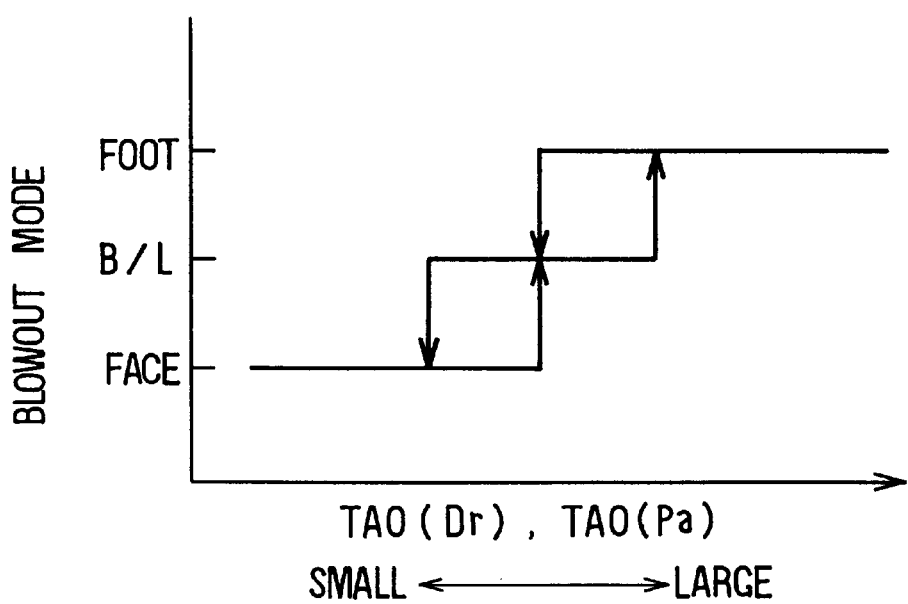
FIG. 5 illustrates a map used to determine ventilation modes in the in the first embodiment.

At step S170, from TAO(Dr) and TAO(Pa) and a characteristic stored in ROM and shown in FIG. 5, ventilation modes for the driver seat side and the passenger seat side are determined. That is, in this preferred embodiment, ventilation modes can be set independently so that the areas into which the conditioned air is blown in the first air-conditioning zone and in the second air-conditioning zone are different.

In addition, a defroster mode can be set as one of the ventilation modes. The defroster mode is a mode wherein conditioned air is only blown from the two ports 52a, 52b, and is switched on when a defroster switch mounted on the above-mentioned air-conditioning control panel is turned on.

Figure 6:
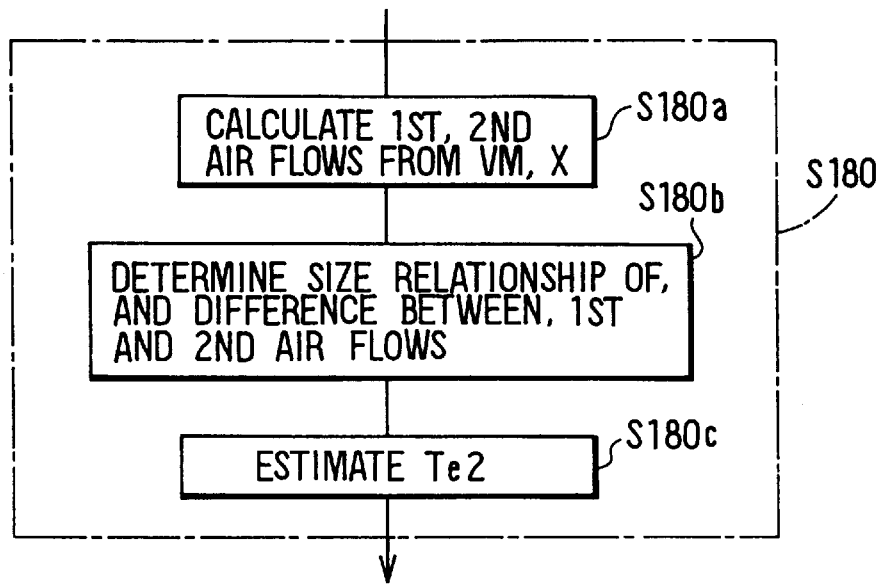
FIG. 6 is a flow diagram showing a method for estimating an air temperature Te1 in first and second preferred embodiments of the present invention.

At step S180, an air cooling degree Te2 (air temperature Te2) in the evaporator 13 in the second passage 10b is estimated. That is, because in this example the post-evaporator sensor 34 is disposed in the first passage 10a, as described above, at step S180 an air temperature Te2 of air just having passed through the evaporator 13 in the second passage 10b is estimated. Specifically, referring to FIG. 6, at step S180a, a first air flow blown through the first passage 10a and a second air flow blown through the second passage 10b are calculated from the above-mentioned necessary blower voltage VM and the flow distribution ratio X.

Then, at step S180b, the relative flow rate values of the first and second air flows are determined, as well as the difference therebetween. Subsequently, at step S180c, based on the results of step S180a, the above-mentioned air temperature Te2 is estimated. For example, when the air temperature Te1 (the temperature detected by the post-evaporator sensor 34) is 5° C. and the first flow is greater than the second flow, the air temperature Te2 is estimated at a value less than the air temperature Te1, because air passing through the second passage 10b will be cooled to a greater degree. In this case, the air temperature Te2 is estimated to be less than the air temperature Te1 in proportion to the difference between the first flow and the second flow.

On the other hand, when for example the air temperature Te1 is 5° C. but the first flow is smaller than the second flow, because air passing through the second passage 10b will be cooled to a lesser degree than air passing through the first passage 10a, the air temperature Te2 is estimated at a value greater than the air temperature Te1. In this case, the air temperature Te2 is estimated to be greater than the air temperature Te1 in proportion to the difference between the first flow and the second flow. Thus in this preferred embodiment, in an air-conditioning unit wherein only a single post-evaporator sensor 34 is disposed in the first passage 10a to reduce cost, the air cooling degree (Te2) in the second passage 10b can be determined by estimation.

Then, at step S190, based on the following expression Exp. 3 stored in ROM, an aperture SW(Dr) created by the air-mixing door 17a is calculated.

$$SW(Dr) = \{(TAO(Dr) - Te1)/(Tw - Te1)\} \times 100\ (\%) \qquad \text{Exp. 3}$$

At step S200, based on the following expression Exp. 4 stored in ROM, an aperture SW(Pa) of the air-mixing door 17b is calculated using the Te2 estimated at step S180.

$$SW(Pa)\{(TAO(Pa) - Te2)/Tw - Te2)\} \times 100\ (\%) \qquad \text{Exp. 4}$$

At step S210, control signals are output to the various air-conditioning devices so that the blower voltage VM, the aperture of the flow control door 70, the apertures SW(Dr), SW(Pa) of the air-mixing doors 17a, 17b, and the ventilation modes match those determined or calculated at steps S150–180. Because the air temperature Te2 estimated as described above is used as an air-conditioning information signal of the second passage 10b, as is clear from Exp. 4, the temperature of the conditioned air in the second passage 10b can be controlled to a target outlet temperature TAO(Pa) notwithstanding that no post-evaporator sensor 34 is provided in the second passage 10b.

Also, in the inside/outside air mode, servo motor 90 is controlled to obtain the control target values computed in the control unit 30. And when the inside air mode is selected with the above-mentioned inside-outside air changeover switch, the inside air mode is implemented.

(Second Preferred Embodiment)

In a normal vehicle air-conditioning system, when the detected value of the post-evaporator sensor 34 falls below a predetermined degree of cooling (a predetermined temperature, for example 3° C.), the compressor 2 is stopped to prevent frosting of the evaporator 13. However, when as in the preferred embodiment described above a sensor is only provided in the first passage 10a, if the compressor 2 is switched on and off based on a comparison between the detected value (Te1) of this post-evaporator sensor 34 and the above-mentioned predetermined temperature, the following situation may occur.

Because as mentioned above the air temperature Te2 in the second passage 10b will at times be lower than the air temperature Te1 in the first passage 10a, although there is no frosting in the part of the evaporator 13 in the first passage 10a, frosting may occur in the part of the evaporator 13 located in the second passage 10b.

Figure 7:
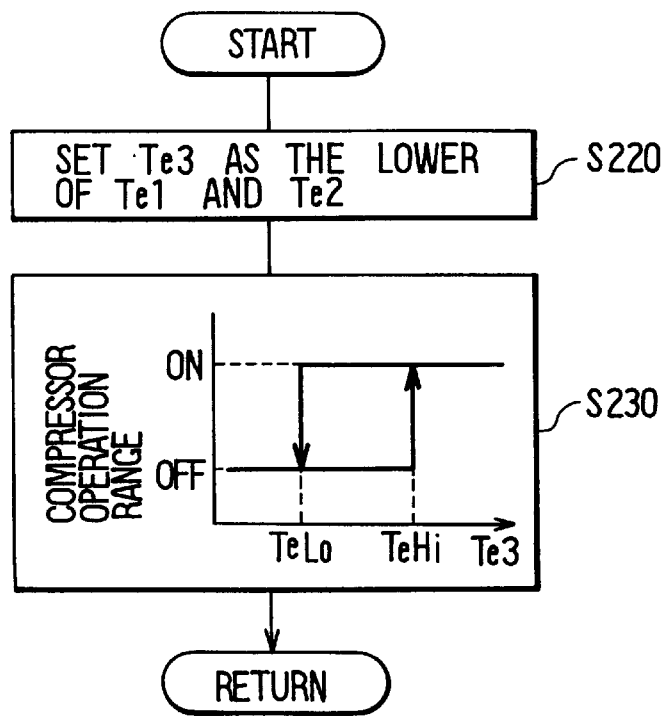
FIG. 7 is a flow diagram showing a usage example of an air temperature Te1 in the second preferred embodiment.

Therefore, in the second preferred embodiment, the air temperature Te2 used in the first preferred embodiment is used to control the electromagnetic clutch 104. FIG. 7 is a flow diagram showing this control. It should be understood that the estimation of the air temperature Te2 is the same in the first preferred embodiment.

First, at step S220, whichever of the air temperature Te1 and the air temperature Te2 has the lower value is set as an air temperature Te3. Then, at step S230, whether or not the compressor 2 is to be operated, that is, whether the electromagnetic clutch 104 is to be on or off, is determined from the map shown in FIG. 7 based on the air temperature Te3. Here, TeLo is the temperature (air cooling degree) at which frosting of the evaporator 13 occurs and is a compressor stop temperature at which the electromagnetic clutch 104 is switched off and the compressor 2 is thereby stopped. In the present embodiment, TeLo is 3° C. TeHi, on the other hand, is a compressor operation temperature at which the electromagnetic clutch 104 is switched on and the compressor 2 is thereby operated. In this example, TeHi is 4° C. Therefore, when the air temperature Te3 falls below TeLo, the compressor 2 is stopped. Thus, frosting and a consequent decrease in air flow can be prevented over the entire area of the evaporator 13.

Figure 8:
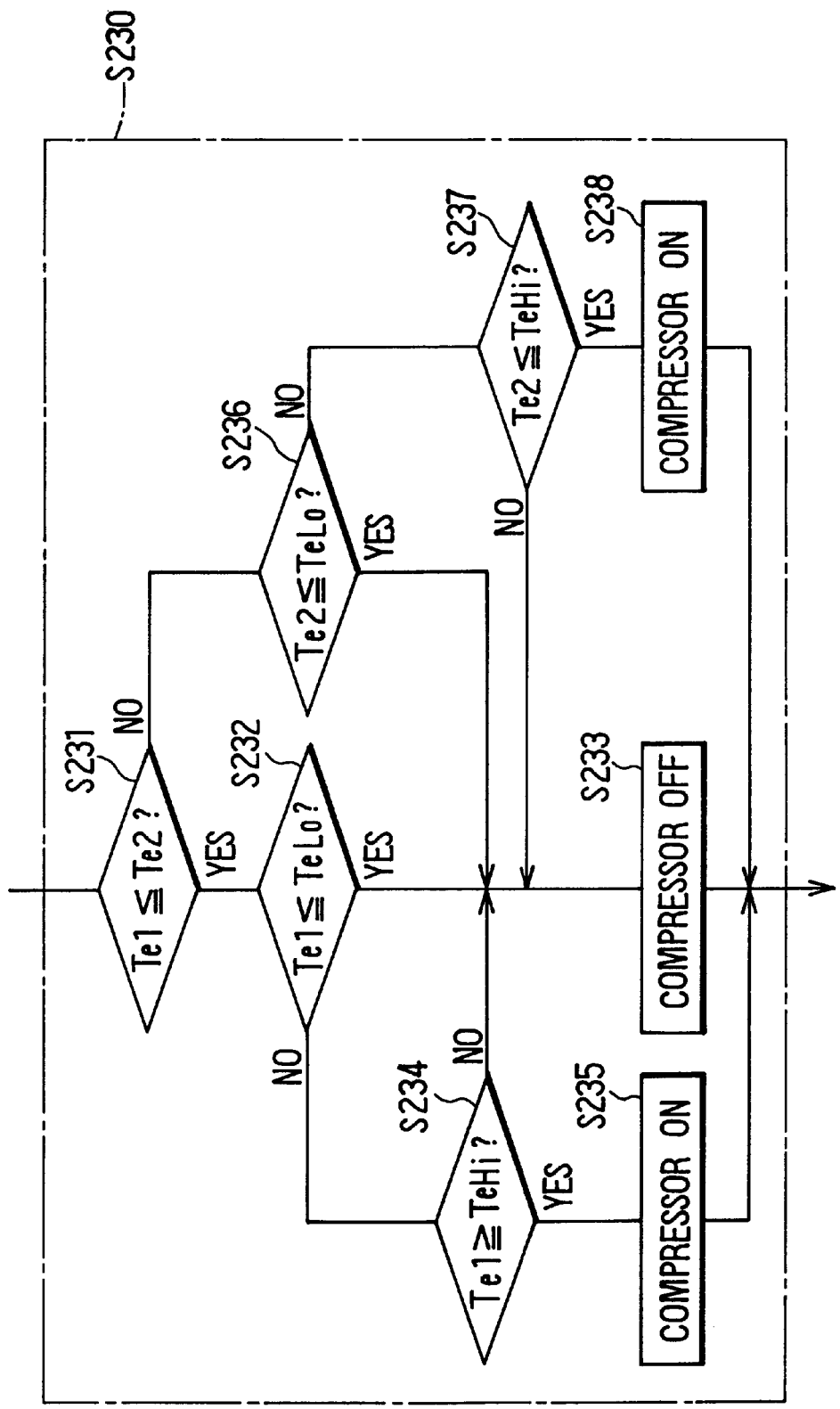
FIG. 8 is a flow diagram illustrating the usage example of the air temperature Te1 in the second preferred embodiment.

FIG. 8 shows the map of FIG. 7 in the form of a flow diagram, which will now be briefly explained. At step S231 it is determined whether or not the air temperature Te1 is lower than the air temperature Te2. If the air temperature Te1 is lower than the air temperature Te2 then processing proceeds to step S232. At step S232 it is determined whether or not the air temperature Te1 is equal to or lower than TeLo. If the determination here is YES, then processing proceeds to step S233 and switches off the compressor 2.

If the determination at step S232 is NO, then processing proceeds to step S234 and determines whether or not the air temperature Te1 is equal to or greater than TeHi. When at step S234 the determination is YES, at step S235 the compressor 2 is switched on. When at step S234 the determination is NO, processing proceeds to step S233.

When at step S231 the determination is NO, the air temperature Te2 is lower than the air temperature Te1, and processing proceeds to step S236. At step S236 it is determined whether or not the air temperature Te2 is equal to or lower than TeLo. When the determination is YES then processing proceeds to step S233.

When at step S236 the determination is NO, processing proceeds to step S237 and determines whether or not the air temperature Te2 is equal to or greater than TeHi. When at step S237 the determination is YES, at step S238 the compressor 2 is switched on. When at step S237 the determination is NO, processing proceeds to step S233.

(Third Preferred Embodiment)

In this preferred embodiment, step 180 in the first and second preferred embodiments is modified. That is, although in the first and second preferred embodiments the air temperature Te2 was estimated based on the air flow in each passage and the air temperature Te1, it is necessary to know how much heat is absorbed into the evaporator 13 from the air passing through the evaporator 13 (the amount of heat transfer) to estimate the air temperature Te2 accurately. Therefore, in this third preferred embodiment, the air temperature Te2 is estimated based on a difference between an intake air temperature Tain of air entering the evaporator 13 and the air temperature Te1, using temperature efficiency as an index of the amount of heat transfer.

In this preferred embodiment, the intake air temperature Tain is detected using an existing sensor. Specifically, in the control unit 30, the inside-outside air mode state is determined. If the inside-outside air mode is the inside air mode in the control unit 30, the value detected by the inside air temperature sensor 31 is used as the intake air temperature Tain because the intake air temperature Tain is the inside air temperature. When on the other hand the outside air mode has been selected, the value detected by the outside air temperature sensor 32 is used as the intake air temperature Tain because the intake air temperature Tain is the outside air temperature.

Also, although in the first and second preferred embodiments described above the first air flow and the second air flow were calculated from the distribution ratio X and the necessary blower voltage VM, the flows differ according to the flow resistances of the passages 10a and 10b, and the ventilation resistances differ according to the ventilation mode of each passage. For this reason, in this preferred embodiment, the first and second air flows are ascertained accurately in correspondence with the ventilation mode.

Figure 9:
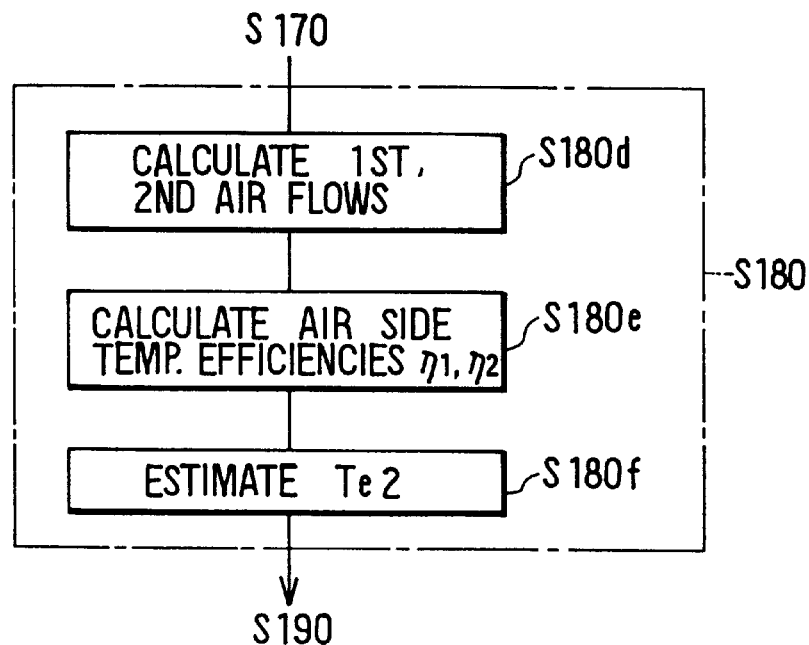
FIG. 9 is a flow diagram showing a method for estimating an air temperature Te1 in a third preferred embodiment of the present invention.
Figure 10:
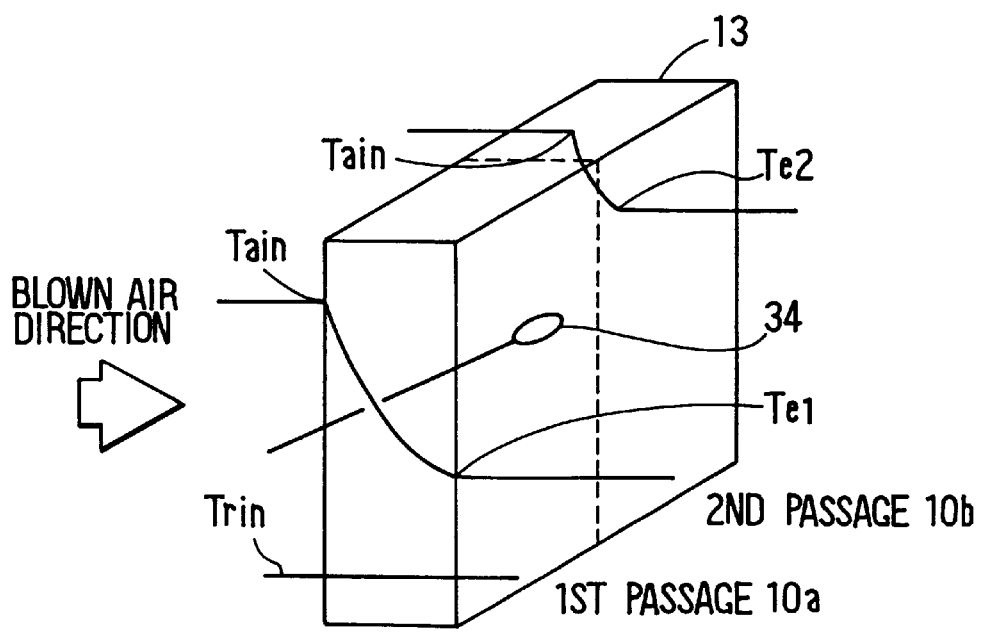
FIG. 10 is an explanatory view illustrating the method for estimating the air temperature Te1 in the third preferred embodiment.

FIG. 9 is a flow diagram showing the method for estimating the air temperature Te2 of this preferred embodiment. FIG. 10 is a view illustrating the temperature state of air passing through the evaporator 13.

At step S180d, the first air flow and the second air flow are calculated in correspondence with the respective ventilation modes. Here, specifically, the first air flow and the second air flow are calculated as in the first and second preferred embodiments. However, in this preferred embodiment, the first flow and the second flow are converted to final values by being multiplied by coefficients to take the ventilation modes into account.

Figure 11:
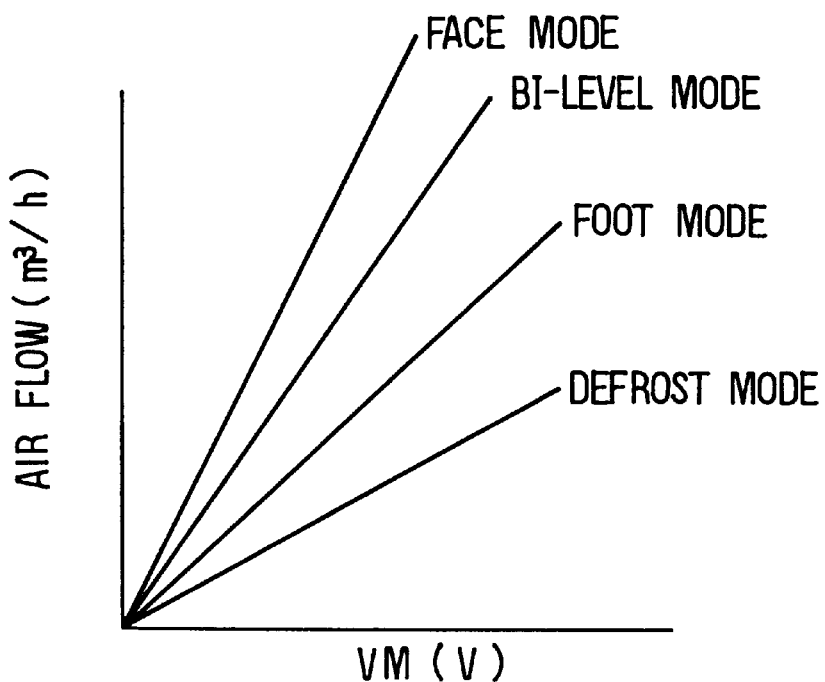
FIG. 11 is a view illustrating how a first flow and a second flow differ according to ventilation modes in the third preferred embodiment.

For example, in this preferred embodiment, because the flow resistances of the ventilation modes increase in the order of face mode, bi-level mode, foot mode, defroster mode, air flow decreases in the same order, as shown in FIG. 11. Accordingly, the above-mentioned coefficients are preset, for example, to 1 when the ventilation modes of the first and second passages 10a, 10b are both the face mode; 0.8 for the bi-level mode; 0.7 for the foot mode; and 0.6 for the defroster mode. In this way, accurate first and second air flows can be calculated in accordance with the ventilation modes.

At step S180e, an air side temperature efficiency η1 of the first passage 10a and an air side temperature efficiency η2 of the second passage 10b are determined. Here, temperature efficiency η is a value generally used in the field of heat exchangers and can be expressed using the following Exp. 6.

$$\text{temperature efficiency } \eta = \qquad\qquad \text{Exp. 6}$$

(intake air temperature Tain of evaporator 13–air temperature immediately after evaporator 13)/(intake air temperature Tain of evaporator 13–refrigerant temperature Trin of evaporator 13)

Figure 12:
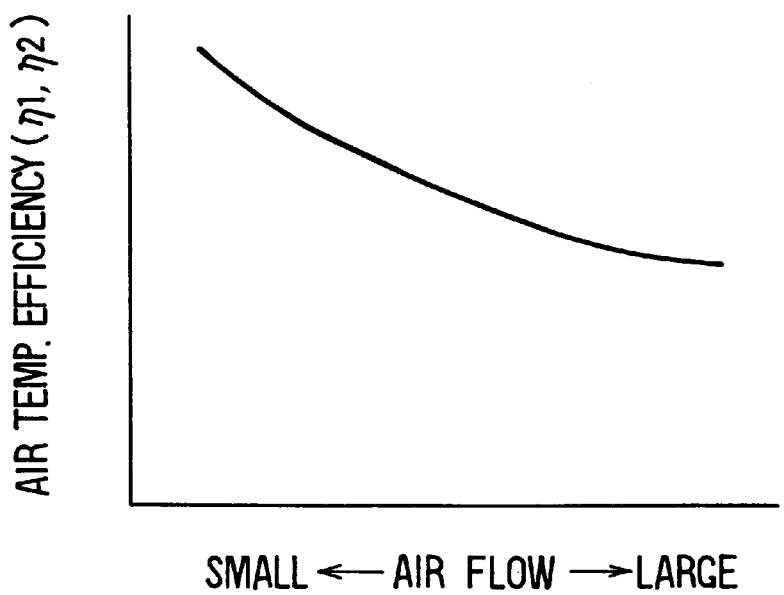
FIG. 12 is a map diagram showing a method for setting temperature efficiency and first and second flows in the third preferred embodiment.

This temperature efficiency η is changed by various conditions, but as shown in FIG. 12 becomes smaller as the flow passing through the evaporator 13 increases. Based on FIG. 12, the temperature efficiencies η1, η2 are determined from the first and second air flows calculated at step S180d.

Then, at step S180f, an air temperature Te2 is estimated based on the first flow, the second flow and the temperature efficiencies η1, η2 calculated or determined at steps S180d, 180e as will now be explained.

First, the temperature efficiencies η1, 72 2 can be calculated not only from the map shown in FIG. 12 but also from the following expressions Exp. 7 and Exp. 8 corresponding to the above-mentioned Exp. 6.

$$\text{temperature efficiency } \eta 1 = (Tain - Te1)/(Tain - Trin) \qquad \text{Exp. 7}$$

$$\text{temperature efficiency } \eta 2 = (Tain - Te2)/(Tain - Trin) \qquad \text{Exp. 8}$$

However, because the refrigerant temperature inside the evaporator 13 undergoes substantial isothermal change, the same inlet side refrigerant temperature Trin was used for both the first passage 10a side and the second passage 10b side.

Rearranging Exp. 7, Trin can be expressed in terms of η1, Tain and Te1. Substituting these for Trin in Exp. 8 and rearranging, Te2 can be finally expressed by the following Exp. 9.

$$Te2 = Tain - \eta 2/\eta 1(Tain - Te1) \qquad \text{Exp. 9}$$

For example if Tain is 20° C., Te1 is 10° C., the first flow is larger than the second flow, η2>η1, η2=0.6 and η1=0.3, then Te2 is 0° C. If on the other hand among these conditions the first flow is smaller than the second flow and η2<η1, η2=0.3 and η1=0.6, then Te2 is 15° C.

Thus in this example, because the first flow and the second flow are calculated taking into account the respective ventilation modes, accurate first and second flows can be calculated and an accurate air temperature Te2 can be estimated. In addition, because the air temperature Te2 is estimated based on the difference between the intake air temperature Tain and the air temperature Te1, a still more accurate air temperature Te2 can be estimated.

(Fourth preferred embodiment)

Figure 13:
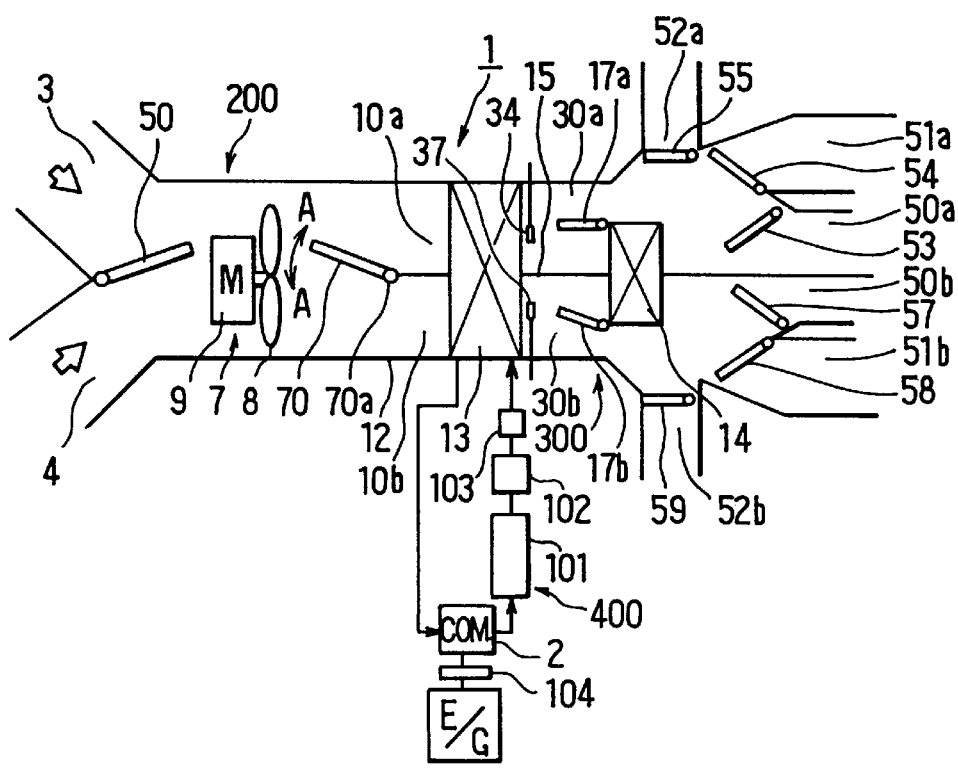
FIG. 13 is a schematic view showing a vehicle air-conditioning system according to a fourth preferred embodiment of the present invention.

The fourth embodiment of the present invention will be now described with reference to FIGS. 13–20. In an air-conditioning system of the fourth embodiment, the components similar to those in the first embodiment are indicated with the same reference numbers, and the explanation thereof is omitted. As shown in FIG. 13, in the fourth embodiment, a post-evaporator sensor 37 for detecting the temperature of air having just passed through the evaporator 13 is also disposed in the second air passage 10b. Therefore, temperature of air having just passed through the evaporator 13 in the second air passage 10b is detected by the post-evaporator sensor 37.

Here, a control method of the air-conditioning system according to the fourth embodiment will be now described. In the fourth embodiment, the driver seat side temperature setter 36a and the passenger seat side temperature setter 36b are designed in such a manner that the set temperature Tset(Dr) for the driver seat side of the passenger compartment and the set temperature Tset(Pa) for the front passenger seat side of the passenger compartment can be set every 0.5° C. in a range of 20–30° C. Further, an air amount blown by the blower 7 is changed in this order of OFF, LO, M1, M2, M3 and H1 by a blower switch provided on the air-conditioning control panel.

Figure 14:
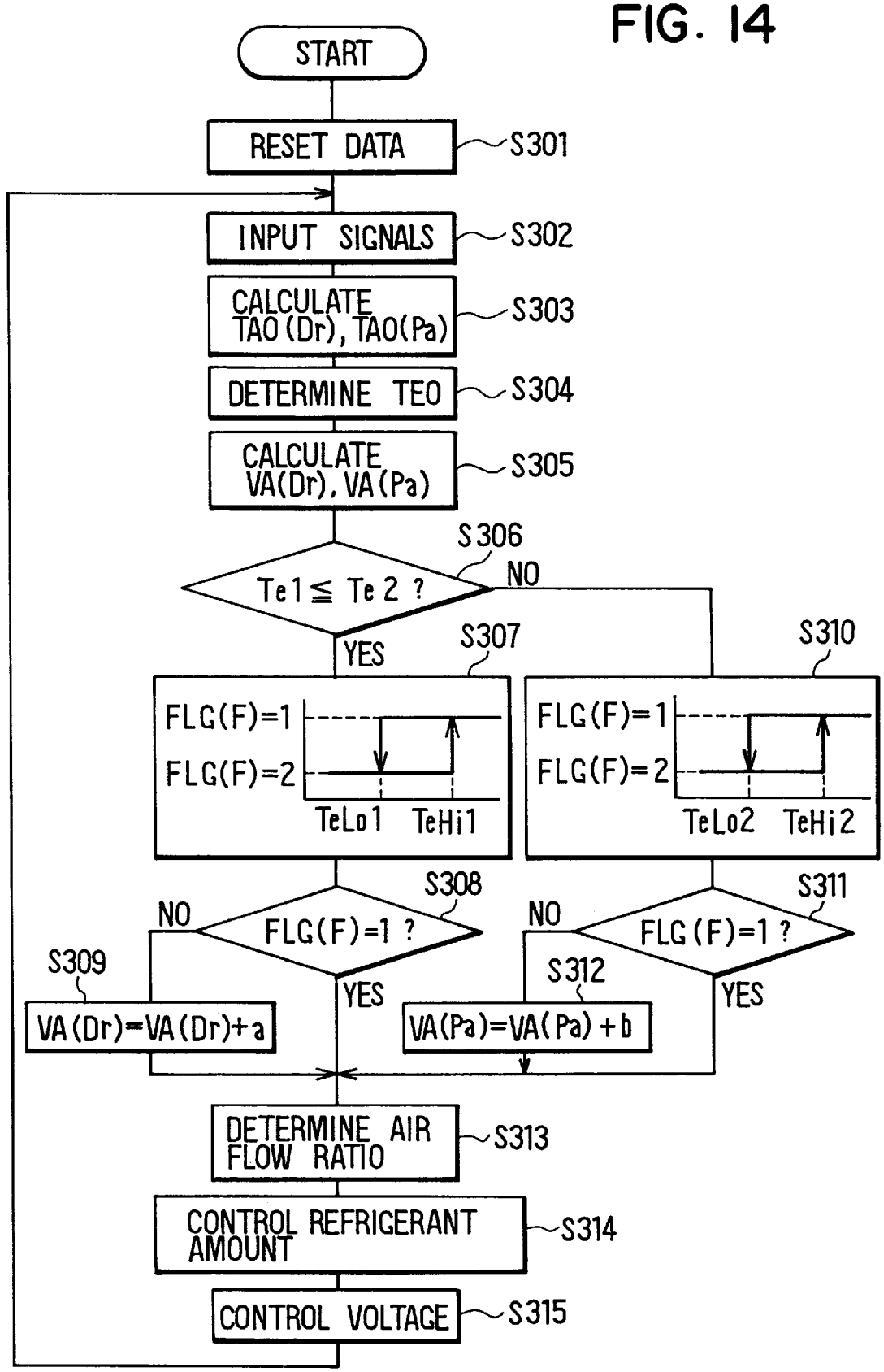
FIG. 14 is a flow diagram showing a control program of an electronic control unit (ECU) according to the fourth embodiment.

When the engine ignition switch is turned on and power is supplied to the ECU 30, the control routine shown in FIG. 14 is started. As shown in FIG. 14, firstly, date is reset (initialized) at step S301. Then, at step S302, switch signals from various switches and sensor signals from various sensors are input. For example, the switch signals includes the set temperature Tset(Dr) set by the driver seat side temperature setter 36a and the set temperature Tset(Pa) set by the passenger seat side temperature setter 36b. Further, the sensor signals includes the inside air temperature (Tr), the outside air temperature (Tam), the first solar radiation amount Ts(Dr) entering the first air-conditioning zone (i.e., driver seat side zone), the second solar radiation amount Ts(Pa) entering the second air-conditioning zone (i.e., front passenger seat side zone), the air temperature (Te1) detected by the post-evaporator sensor 34, the air temperature (Te2) detected by the post-evaporator sensor 37, and the engine-cooling water temperature (Tw).

At step S303, the target temperature of the conditioned air blown from the first passage 10a, that is, the first target outlet temperature (TAO(Dr)) of the conditioned air blown into the driver seat side space, and a target temperature of the conditioned air blown from the second passage 10b, that is, the second target outlet temperature (TAO(Pa)) of the conditioned air blown into the passenger seat side, are calculated based on Exp. 1 and Exp. 2 described in the above-described first embodiment.

Figure 15A:
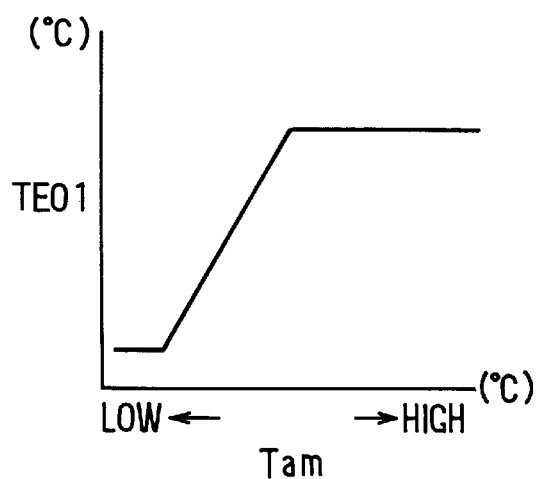
FIG. 15A is a graph showing the relationship between an outside air temperature (Tam) and a first target post-evaporator air temperature (TEO1)
Figure 15B:
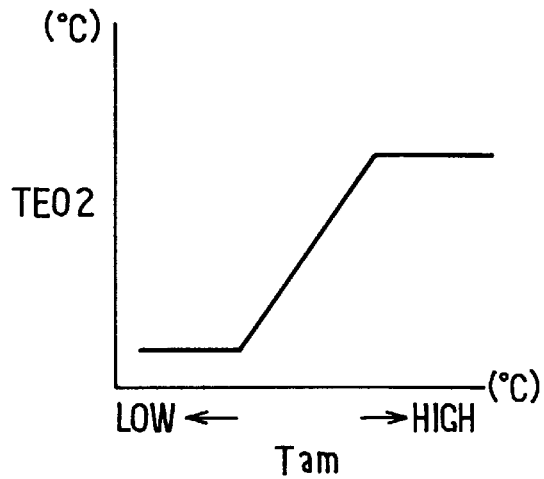
FIG. 15B is a graph showing the relationship between an outside air temperature (Tam) and a second target post-evaporator air temperature (TEO2), according to the fourth embodiment.

Next, a first target post-evaporator air temperature (TEO1) is calculated based on the outside air temperature (Tam) detected by the outside air temperature sensor 32 and the graph shown in FIG. 15A. Similarly, a second target post-evaporator air temperature (TEO2) is calculated based on the outside air temperature (Tam) and the graph shown in FIG. 15B. Next, at step S304, a target post-evaporator air temperature (TEO) which is a smaller one between the first target post-evaporator air temperature (TEO1) and the second target post-evaporator air temperature (TEO2) is determined based on EXP. 10.

$$TEO = \text{Min}\,[TEO1, TEO2] \qquad \text{EXP. 10}$$

Figure 16A:
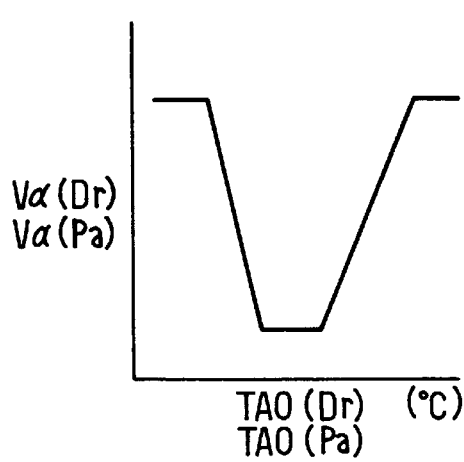
FIG. 16A is a graph showing Vα (Dr), Vα (Pa)) relative to a first target air temperature TAO(Dr) for a driver's seat side and a second target air temperature TAO(Pa) for a passenger's seat side.
Figure 16B:
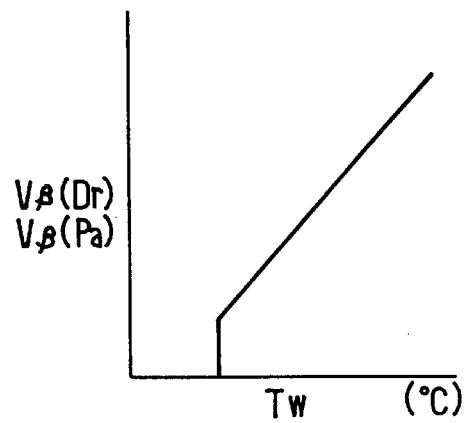
FIG. 16B is a graph showing Vβ (Dr), Vβ (Pa) relative to temperature Tw of engine-cooling water.
Figure 16C:
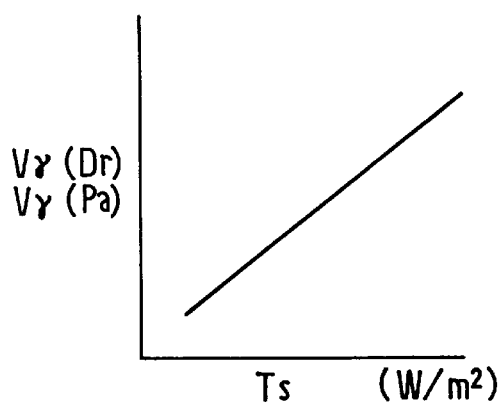
FIG. 16C is a graph showing Vγ (Dr), Vγ (Pa) relative to an amount Ts of solar radiation, according to the fourth embodiment.
Figure 17A:
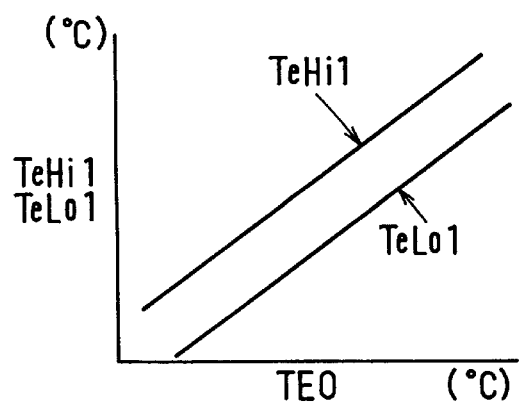
FIG. 17A is a map showing TeLo1 and TeHi1 relative to the target post-evaporator air temperature (TEO)
Figure 17B:
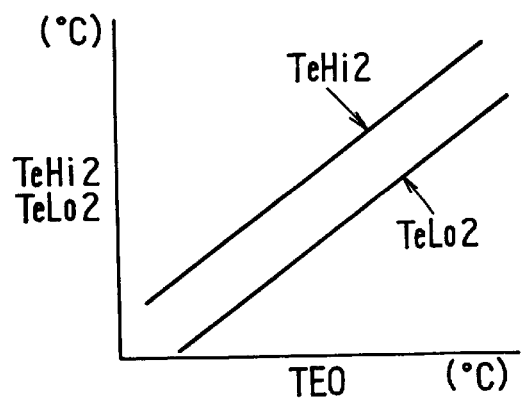
FIG. 17B is a map showing TeLo2 and TeHi2 relative to the target post-evaporator air temperature (TEO), according to the fourth embodiment.

At step S305, using characteristics shown in FIGS. 16A, 16B, 16C and EXP. 11, EXP. 12, from the above-mentioned TAO(Dr) and TAO(Pa), a driver seat side necessary blower voltage VA(Dr) (first target air flow), which is a target value of the flow of the conditioned air blown through the first passage 10a, and a passenger seat side necessary blower voltage VA(Pa) (second target air flow), which is a target value of the flow of the conditioned air blown through the second passage 10b, are calculated.

$$VA(Dr) = \text{Min}\{V\beta(Dr), \text{Max}[V\alpha(Dr), V\gamma(Dr)]\} \qquad \text{EXP. 11}$$

$$VA(Pa) = \text{Min}\{V\beta(Pa), \text{Max}[V\alpha(Pa), V\gamma(Pa)]\} \qquad \text{EXP. 12}$$

Here, $V\alpha(Dr)$, $V\beta(Dr)$, $V\gamma(Dr)$, $V\alpha(Pa)$, $V\beta(Pa)$ and $V\gamma(Pa)$ are determined based on characteristic graphs shown in FIGS. 16A, 16B, 16C.

Next, at step S306, it is determined whether or not the air temperature (Te1) detected by the driver seat side post-evaporator sensor 34 is equal to or lower than the air temperature (Te2) detected by the passenger seat side post-evaporator sensor 37. When the air temperature (Te1) is not higher than the air temperature (Te2) at step S306, the air temperature (Te1) is used as a determination value for preventing frosting of the evaporator 13. That is, a temperature (TeLo1) and a temperature (TeHi1) higher than the temperature (TeLo1) are set based on the target post-evaporator air temperature (TEO) and the characteristic graph shown in FIG. 17A. When the detected post-evaporator air temperature (Te1) is in a condition where the evaporator 13 is not frosted, the flag FLG(F) is set to 1 at step S307. On the other hand, when the detected post-evaporator air temperature (Te1) is in a condition where the evaporator 13 is frosted, the flag FLG(F) is set to 2 at step S307.

Next, at step S308, it is determined whether or not the flag FLG(F)=1. When the flag FLG(F) is equal to 1, air flow ratio in the first and second air passages 10a, 10b are determined at step S313. When the flag FLG(F) is not equal to 1, the driver seat side necessary blower voltage VA(Dr) is corrected to be increased based on EXP. 13, so that air flow amount in the first air passage 10a is increased.

$$VA(Dr) = VA(Dr) + a \qquad \text{EXP. 13}$$

Here, "a" may be a predetermined constant (e.g., 0.5V–3.5V), or may be the absolute value of a difference between the driver seat side necessary blower voltage VA(Dr) and the passenger seat side necessary blower voltage VA(Pa), as shown by EXP. 14.

$$a = |VA(Dr) - VA(Pa)| \qquad \text{EXP. 14}$$

Figure 18A:
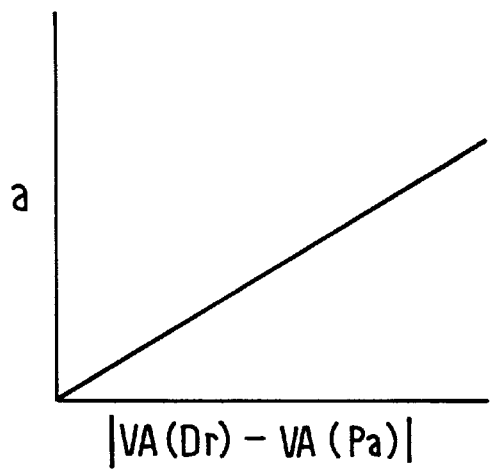
FIGS. 18A, 18B are views showing a correction value "a" relative to |VA(Dr)−VA(Pa)| and a correction value "b" relative to |VA(Dr)−VA(Pa)|, according to the fourth embodiment.
Figure 19A:
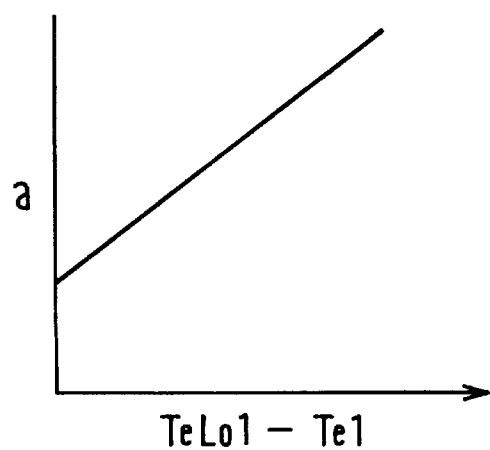
FIGS. 19A, 19B are views showing a correction value "a" relative to (TeLo1−Te1) and a correction value "b" relative to (TeLo2−Te2), according to the fourth embodiment.

Further, "a" may be a variable value which is changed based on a difference between the driver seat side necessary blower voltage VA(Dr) and the passenger seat side necessary blower voltage VA(Pa), as shown in FIG. 18A, or "a" may be a variable value which is changed based on a difference of (TeLo1–Te1) as shown in FIG. 19A. Here, Te1≦TeLo1.

When a difference (TeLo1–Te1) becomes larger, frosting possibility of the evaporator 13 is increased. On the other hand, when the air temperature (Te1) is larger than the temperature (Te2) at step S306 in FIG. 14, the temperature (Te2) is used as a determination value for preventing frosting of the evaporator 13. That is, a temperature (TeLo2) and a temperature (TeHi2) higher than the temperature (TeLo2) are set based on the target post-evaporator air temperature (TEO) and characteristic graph shown in FIG. 17B. When the detected post-evaporator air temperature (Te2) is in a condition where the evaporator 13 is not frosted, the flag FLG(F) is set to 1 at step S310. On the other hand, when the detected post-evaporator air temperature (Te) is in a condition where the evaporator 13 is frosted, the flag FLG(F) is set to 2 at step S310.

Next, at step S311, it is determined whether or not the flag FLG(F)=1. When the flag FLG(F) is not equal to 1, the passenger seat side necessary blower voltage VA(Pa) is corrected based on EXP. 15, so that air flow amount on the passenger seat side is increased.

$$VA(Pa) = VA(Pa) + b \qquad \text{EXP. 15}$$

Here, "b" may be a predetermined constant (e.g., 0.5V–3.5V), or may be the absolute value of a difference between the driver seat side necessary blower voltage VA(Dr) and the passenger seat side necessary blower voltage VA(Pa), as shown by EXP. 16.

$$b = |VA(Dr) - VA(Pa)| \qquad \text{EXP. 16}$$

Figure 18B:
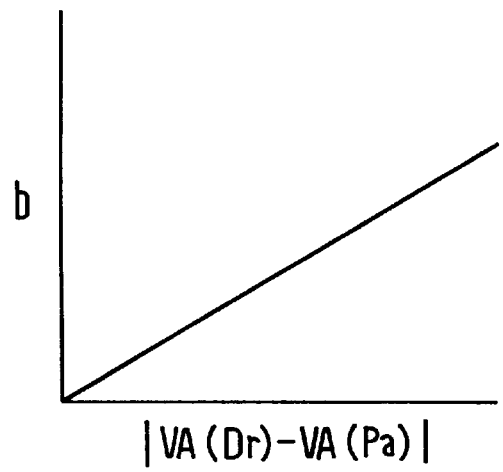
Figure 19B:
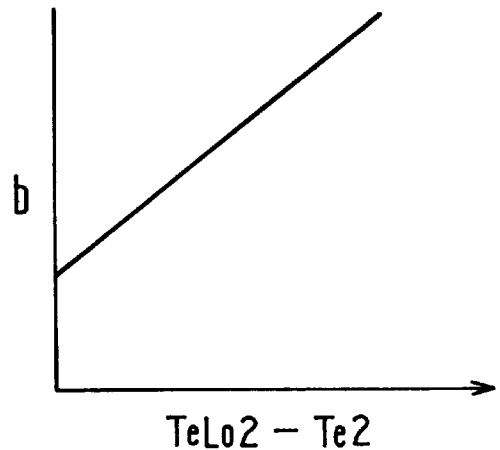

Further, "b" may be a variable value which is changed based on a difference between the driver seat side necessary blower voltage VA(Dr) and the passenger seat side necessary blower voltage VA(Pa), as shown in FIG. 18B, or "b" may be a variable value which is changed based on a difference of (TeLo2−Te2) as shown in FIG. 19B. Here, Te2≦TeLo2. When a difference (TeLo2−Te2) becomes larger, frosting possibility of the evaporator 13 is increased.

Next, a ratio between the driver seat side necessary blower voltage VA(Dr) and the passenger seat side necessary blower voltage VA(Pa) is determined, and the rotation position of the flow control door 70 is determined at step S113. Therefore, air flow ratio in the first and second air passages 10a, 10b are determined. That is, at step S313, a door opening degree (DX) of the flow control door 70 is obtained by the following Exp. 17.

$$DX = VA(Dr) \times 100 / [VA(Dr) + VA(Pa)] \ (\%) \qquad \text{EXP. 17}$$

When the door opening degree (DX) is 100%, the air flow in the first air passage 10a becomes maximum. When the door opening degree (DX) is 0%, the air flow in the second air passage 10b becomes maximum. When the door opening degree (DX) is 50%, the air flow in the first air passage 10a becomes equal to the air flow in the second air passage 10b.

When FLG(F)=1 at steps S308, S311, the correction at step S309, S312 is not necessary. Next, at step S314, refrigerant amount discharged from the compressor 2 is controlled. Further, at step S315, voltage applied to the servomotor 70c of the flow control door 70 is controlled so that air flow amounts passing through the first and second air passages 10a, 10b becomes equal to air flow amounts corresponding to the determined driver seat side necessary blower voltage VA(Dr) and the determined passenger seat side necessary blower voltage VA(Pa), respectively. Thereafter, the program returns step S302.

Next, the control of refrigerant amount discharged from the compressor 2 will be now described with reference to FIG. 20. When the control routine shown in FIG. 20 starts, it is determined whether or not the air temperature (Te1) detected by the post-evaporator sensor 34 for the driver seat side is equal to or lower than the air temperature (Te2) detected by the post-evaporator sensor 37 for the front passenger seat side, at step S321. At step S321, when the air temperature (Te1) detected by the post-evaporator sensor 34 is equal to or lower than the air temperature (Te2) detected by the post-evaporator sensor 37, it is determined whether or not outside air temperature (Tam) detected by the outside air temperature sensor 32 is not higher than a predetermined temperature T (e.g., T=5° C.) at step S322. When the outside air temperature Tam is equal to or lower than the predetermined temperature T at step S322, a detected post-evaporator air temperature (Te) is set to Tex which is a higher one between the air temperature (Te1) and the air temperature (Te2). Thereafter, at step S328, refrigerant amount discharged from the compressor 2 is controlled based on a difference between Te and TEO. That is, at step S328, the compressor 2 is controlled so that the detected post-evaporator air temperature (Te) becomes the target post-evaporator air temperature (TEO). When the outside air temperature Tam is higher than the predetermined temperature T at step S322, the detected post-evaporator air temperature (Te) is set to Tey which is a lower one between the air temperature (Te1) and the air temperature (Te2). Thereafter, at step S328, refrigerant amount discharged from the compressor 328 is controlled based on a difference between Te and TEO.

On the other hand, when the air temperature (Te1) is higher than the air temperature (Te2) at step S321, it is determined whether or not outside air temperature (Tam) detected by the outside temperature sensor 32 is not higher than a predetermined temperature T (e.g., T=5° C.) at step S325. When the outside air temperature Tam is equal to or lower than the predetermined temperature T at step S325, the detected post-evaporator air temperature (Te) is set to Tex which is a higher one between the air temperature (Te1) and the air temperature (Te2). Thereafter, the program performs step S328. When the outside air temperature Tam is higher than the predetermined temperature T at step S325, the detected post evaporator air temperature (Te) is set to Tey which is a lower one between the air temperature (Te1) and the air temperature (Te2) at step S327. Thereafter, at step S328, refrigerant amount discharged from the compressor 2 is controlled based on a difference between Te and TEO.

According to the air-conditioning system of the fourth embodiment of the present invention, an air amount (air flow) passing through a determined air passage in which the evaporator 13 is possible to be frosted, between the first air passage 10a (driver seat side air passage) and the second air passage 10b (passenger seat side air passage), is corrected to be increased. Therefore, an air amount passing through the other air passage between the first and second air passages 10a, 10b is reduced, thereby improving defrosting performance of the windshield of the vehicle. For example, when the air temperature (Te1) is lower than the air temperature (Te2), it is determined that the evaporator 13 is possible to be frosted in the first air passage 10a, and the air flow amount in the first air passage 10a is corrected to be increased or the air flow amount in the second air passage 10b is corrected to be decreased.

Further, when the outside air temperature (Tam) is lower than a predetermined temperature T (e.g., 5° C.), refrigerant amount discharged from the compressor 2 is controlled so that the post-evaporator air temperature (Te) which is higher one between the first post-evaporator air temperature (Te1) and the second post-evaporator air temperature (Te2) becomes equal to the target post-evaporator air temperature (TEO). Thus, relative to the determined air passage in which the evaporator 13 is possible to be frosted, between the first air passage 10a and the second air passage 10b, temperature of air blown into the passenger compartment from the other air passage can be reduced, thereby preventing the windshield from being fogged (frosted).

On the other hand, when the outside air temperature (Tam) is higher than the predetermined temperature T (e.g., 50° C.), refrigerant amount discharged from the compressor 2 is controlled so that the post-evaporator air temperature (Te) which is lower one between the first post-evaporator air temperature (Te1) and the second post-evaporator air temperature (Te2) becomes equal to the target post-evaporator air temperature (TEO). Therefore, it can prevent the evaporator 13 from being frosted.

In the fourth embodiment, when any one of first and second post-evaporator air temperatures (Te1, Te2) is lower than a predetermined temperature, that is, when any one of the first cooling degree and the second cooling degree is lower than a predetermined degree, a difference between an air amount passing through the first air passage 10a and an air amount passing through the second air passage 10b may be controlled to become smaller. In this case, when the evaporator 13 is possible to be frosted in one of the first and second air passages 10a, 10b, temperature of air flowing through the other air passage between the first and second air passages 10a, 10b is not greatly increased, thereby preventing the windshield from being fogged (or frosted).

(Fifth Preferred Embodiment)

Figure 21:
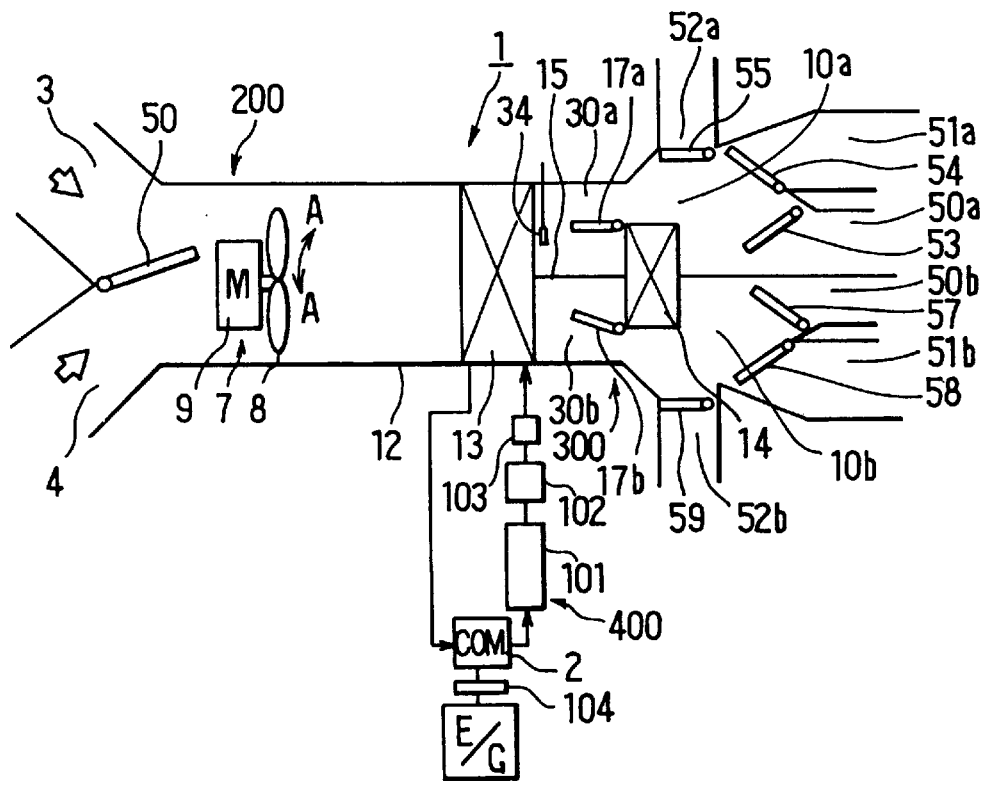
FIG. 21 is a schematic view showing a vehicle air-conditioning system according to a fifth preferred embodiment of the present invention.

A fifth preferred embodiment of the present invention will be now described. A vehicle air-conditioning system according to the fifth embodiment is indicated in FIG. 21. In the fifth embodiment, the first air passage 10a and the second air passage 10b are partitioned from the evaporator 13 toward a downstream side, and the flow control door 70 is omitted. In the fifth embodiment, the other components are similar to those in the first embodiment, and the explanation thereof is omitted. Similarly to the first embodiment, in the fifth embodiment, the second post-evaporator air temperature (Te2) is estimated by the ECU 30 based on the first post-evaporator air temperature (Te1), voltage applied to the blower 7 and the air flow ratio between the first air passage 10a and the second air passage 10b.

When the first post evaporator air temperature (Te1) is 5° C. and the air flow passing through the first air passage 10a is larger than the air flow passing through the second air passage 10b, air passing through the second air passage 10b is more cooled as compared with air passing through the first air passage 10a. Therefore, the second post-evaporator air temperature (Te2) can be estimated to be lower than the first post-evaporator air temperature (Te1). In this case, as the difference between the air flow passing through the first air passage 10a and the air flow passing through the second air passage 10b becomes larger, the estimated second post-evaporator air temperature (Te2) becomes lower than the first post-evaporator air temperature (Te1).

On the other hand, when the first post evaporator air temperature (Te1) is 5° C. and the air flow passing through the first air passage 10a is smaller than the air flow passing through the second air passage 10b, air passing through the second air passage 10b is slightly cooled as compared with air passing through the first air passage 10a. Therefore, the second post-evaporator air temperature (Te2) can be estimated to be higher than the first post-evaporator air temperature (Te1). In this case, as the difference between the air flow passing through the first air passage 10a and the air flow passing through the second air passage 10b becomes larger, the estimated second post-evaporator air temperature (Te2) becomes higher than the first post-evaporator air temperature (Te1).

In the fifth embodiment, each air flow in the first and second air passages 10a, 10b is adjusted by the blower 7, the first face door 54 for opening and closing the driver seat side port 51a and the second face door 58 for opening and closing the passenger seat side port 51b. During the face mode or the bi-level mode, when the air flow passing through the second air passage 10b is made larger than the air flow passing through the first air passage 10a, the opening degree of the second face door 58 is set to be larger than the opening degree of the first face door 54. Conversely, when the air flow passing through the second air passage 10b is made smaller than the air flow passing through the first air passage 10a, the opening degree of the second face door 58 is set to be smaller than the opening degree of the first face door 54. The other ports may be controlled similarly to the ports 51a, 51b.

[Sixth Preferred Embodiment]

A sixth preferred embodiment of the present invention will be described with reference to FIG. 22. In the sixth embodiment, the compressor 2 is an ON/OF type compressor, and the other portions are similar to those in the fourth embodiment. Therefore, the compressor 2 is controlled to prevent the frosting of the evaporator 13.

Figure 20:
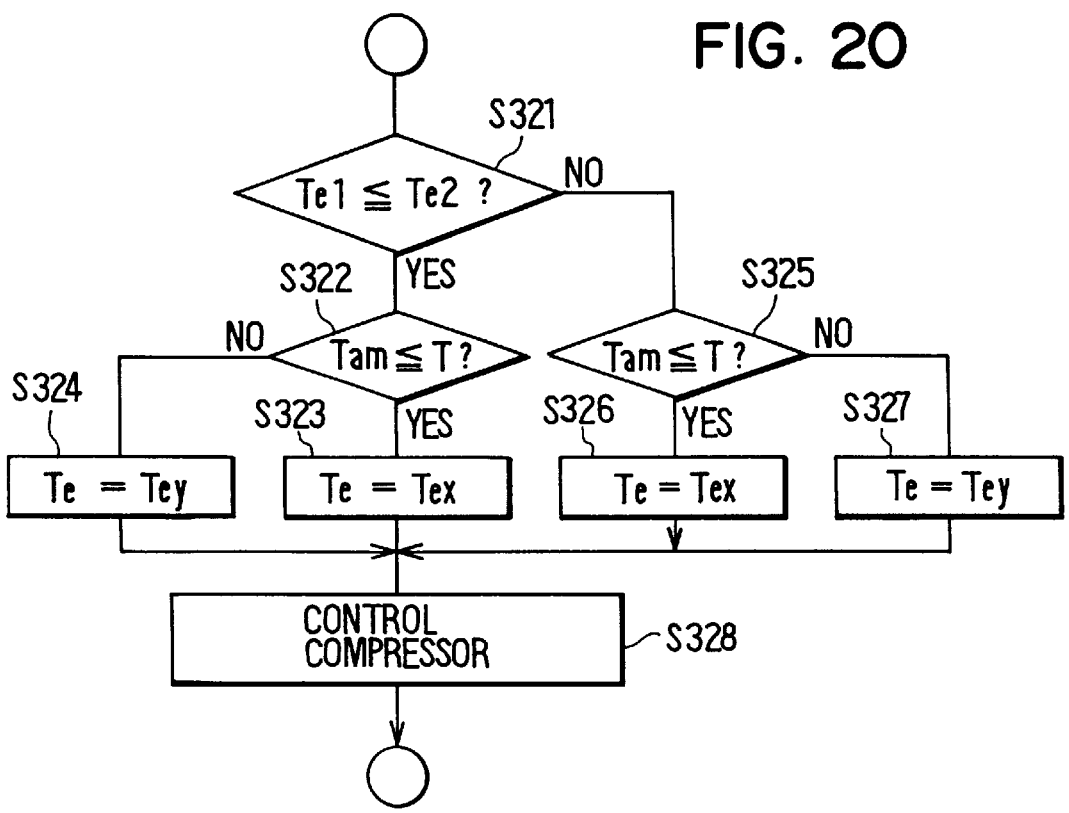
FIG. 20 is a flow diagram showing a control of refrigerant amount discharged from a compressor according to the fourth embodiment.
Figure 22:
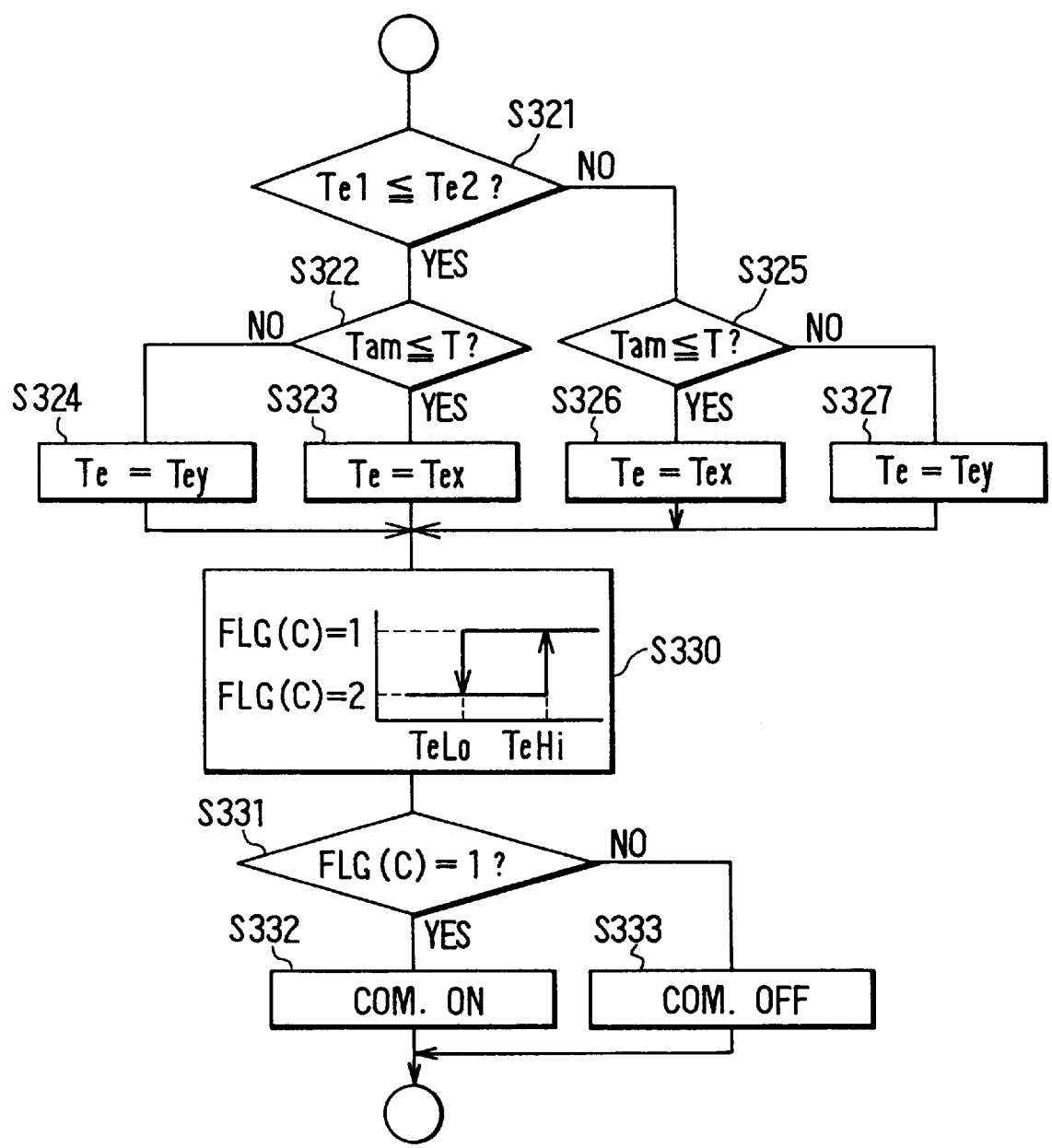
FIG. 22 is a flow diagram showing a control of a compressor according to a sixth preferred embodiment of the present invention.

In FIG. 22, the steps S321–S327 are similar to those in FIG. 20 of the fourth embodiment, and the explanation thereof is omitted. As shown in FIG. 22, after any one step among steps S323, S324, S326, S327, ON/OFF control of the compressor 2 is performed at step S330. That is, the post-evaporator air temperature (Te) is used as a determination value of frosting of the evaporator 13. The compressor 2 is turned on when the flag FLG(C) is set to 1, and the compressor 2 is turned off when the flag FLG(C) is set to 2. At step S330 in FIG. 22, the TeLo and TeHi may be constant values (e.g., TeLo=3° C., TeHi=4° C.), or may be set based on the target post-evaporator air temperature (TEO) or the outside air temperature (Tam).

Next, at step S331, it is determined whether or not the flag FLG(C) is equal to 1. When FLG(C)=1, the electromagnetic clutch 104 is turned on, and the compressor 2 is operated at step S332. When the flag FLG(C) is not equal to 1 at step S331, the electromagnetic clutch 104 is turned off, and operation of the compressor 2 is stopped at step S333.

According to the sixth embodiment of the present invention, when the detected post-evaporator air temperature (Te) is lower than the TeLo, the electromagnetic clutch 104 is turned off, and the operation of the compressor 2 is stopped. Therefore, the air-conditioning system of the sixth embodiment prevents the evaporator 13 from being frosted while preventing the windshield from being fogged.

[Seventh Preferred Embodiment]

Figure 23:
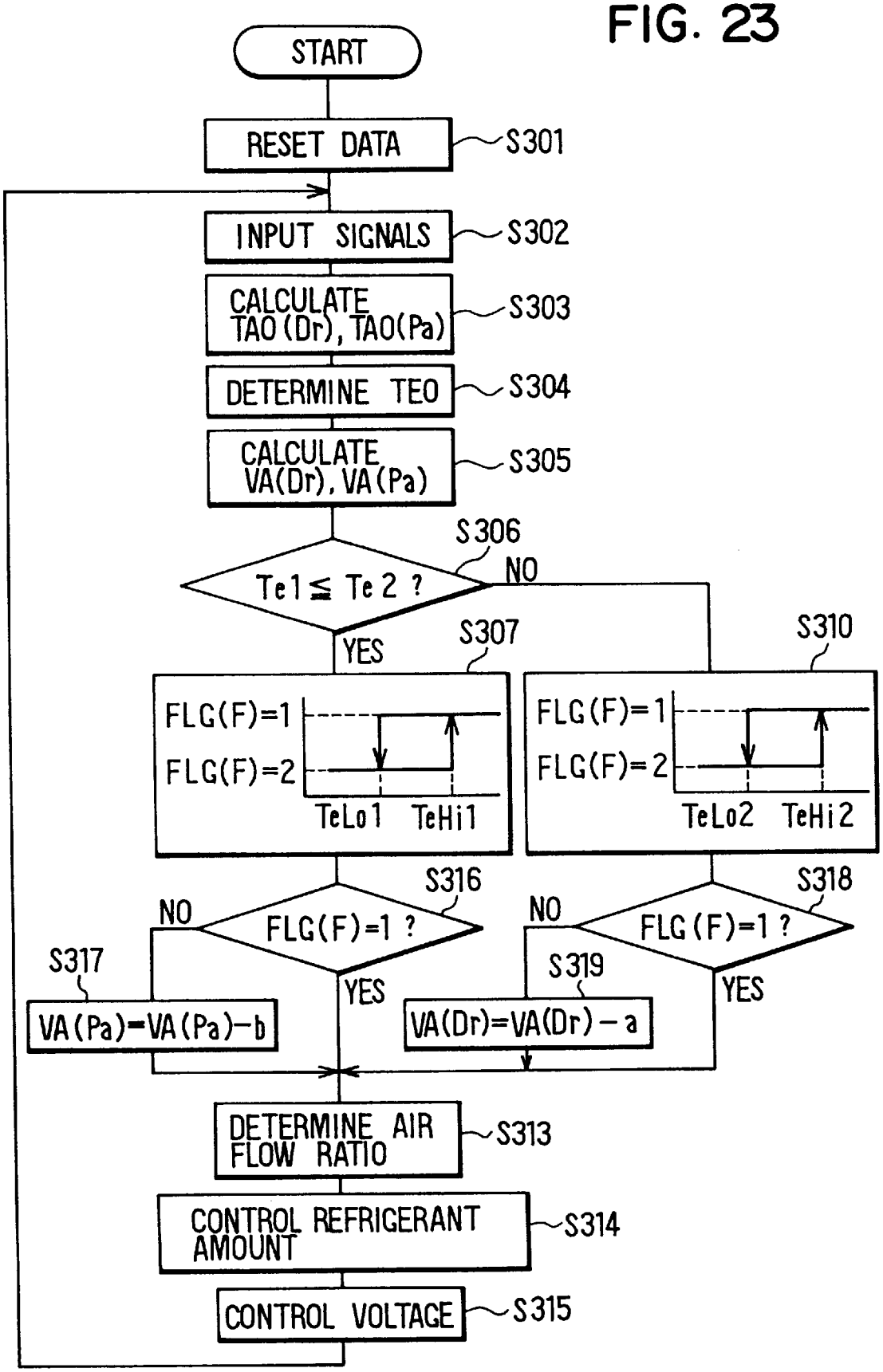
FIG. 23 is a flow diagram showing a control program of an electronic control unit (ECU) according to a seventh preferred embodiment of the present invention.

A seventh preferred embodiment of the present invention will be now described with reference to FIG. 23. In FIG. 23, the same steps as those in FIG. 14 of the fourth embodiment are indicated with the same step numbers, and the explanation thereof is omitted. As shown in FIG. 23, after the frosting determination at step S307, it is determined whether or not the flag FLG(F)=1 at step S316. When the flag FLG(F) is not equal to 1, the passenger seat side necessary blower voltage VA(Pa) is corrected to be decreased based on EXP. 18, so that air flow amount on the passenger seat side is decreased.

$$VA(Pa) = VA(Pa) - b \qquad \text{EXP. 18}$$

On the other hand, after the frosting determination at step S310, it is determined whether or not the flag FLG(F)=1 at step S318. When the flag FLG(F) is not equal to 1, the driver seat side necessary blower voltage VA(Dr) is corrected to be decreased based on EXP. 19, so that air flow amount on the driver seat side is decreased.

$$VA(Dr) = VA(Dr) - a \qquad \text{EXP. 19}$$

Here, "a" and "b" are obtained similar to those in the above-described fourth embodiment.

According to the seventh embodiment, relative to the air amount (air flow) passing through the determined air passage in which the evaporator 13 is possible to be frosted, between the first air passage 10a (driver seat side air passage) and the second air passage 10b (passenger seat side air passage), air amount passing through the other air passage is corrected to be decreased. Therefore, the air amount passing through the determined air passage is increased, thereby improving defrosting performance of the windshield of the vehicle. That is, in the seventh embodiment, effect similar to that of the fourth embodiment can be obtained.

(Other Preferred Embodiments)

In the preferred embodiments described above, the invention was applied to a left-right independent control type of air-conditioning unit wherein the inside of the air-conditioner case 12 is partitioned into two passages; however, the invention is not limited to this and can also be applied in the following ways.

For example, in an air-conditioning unit wherein the air-conditioner case is not partitioned into left and right passages and there is only one air-mixing door, a flow control door 70 of the kind described above may be provided, and the flow-distributing door may be controlled so that when solar radiation is entering the right side of the vehicle the flow from outlets on the right side of the vehicle is increased to compensate for the heat generated by the solar radiation.

Further, although in the preferred embodiments described above the temperature of the conditioned air is controlled with air-mixing doors 17a, 17b, each for adjusting the mixture ratio of a cool draft and a warm draft, the invention can also be applied to a so-called reheat type air-conditioning unit wherein the amount of warm water supplied to the heater core 14 is controlled or to one wherein the temperature of the warm water supplied to the heater core 14 is controlled.

In addition, in the preferred embodiments described above, the flow control door 70 may alternatively be disposed on the upstream side of the air-mixing doors 17a, 17b. For example, the flow control door 70 may be disposed on the downstream side of the evaporator 13. In this case, a partition 15 is not necessary on the upstream side of the evaporator 13.

In the preferred embodiments described above the flows in the first passage 10a and the second passage 10b were controlled with the flow control door 70. However, the invention can also be applied to a unit wherein a blower is provided for each of the first and second passages 10a, 10b.

Although in the preferred embodiments described above the voltage impressed on the blower motor 9 of the blower 7 is variable, the speed of the blower motor 9 may alternatively be controlled by, for example, pulse width modulation.

Also, in the preferred embodiments described above, in calculating the first flow and the second flow, because the air intake resistances of the inside and outside air modes are different, the inside/outside air mode may also be taken into account.

While the preferred embodiments described above relate to an air-conditioning unit wherein air-conditioning of a driver seat side and a passenger seat side are controlled independently, the invention can be similarly applied for example to a vehicle air-conditioning system wherein conditioned air from a first passage 10a is blown into an air-conditioning zone in the front side of a passenger compartment and conditioned air from a second passage 10b is blown into an air-conditioning zone in the rear side of the passenger compartment.

The preferred embodiments described above also include a post-evaporator sensor 34 for detecting the temperature of air having just passed through the evaporator 13. Alternatively, the sensor may detect the temperature of cooling fins of the evaporator 13.

In addition, in the preferred embodiments described above, the compressor 2 may be made a variable capacity type compressor. When the compressor 2 is made an externally variable capacity type, the compressor capacity can be varied based on the lower of the air temperatures determined at step S231 to thereby prevent frosting of the evaporator 13.

Although the preferred embodiments described above are examples of the present invention applied to a vehicle air-conditioning system, the invention is not limited to vehicle air-conditioning systems and can be applied to any air-conditioning system.

What is claimed is:

1. An air-conditioning system, comprising:
    a housing having first and second passages through which conditioned air is blown into first and second air-conditioning zones, respectively;
    a cooling heat exchanger, disposed in both the first and second passages, for cooling air passing therethrough;
    a flow control mechanism for controlling a flow rate of air in the first and second passages;
    a cooling degree detector, disposed in the first passage downstream from the cooling heat exchanger, for detecting a first cooling degree to which air is cooled; and
    a cooling degree estimator for estimating a second cooling degree to which air in the second passage is cooled, based on at least a first air flow blown through the first passage and a second air flow blown through the second passage, and the first cooling degree.

2. The air-conditioning system according to claim 1, wherein the cooling degree estimator estimates the second cooling degree to be greater than the first cooling degree when the first passage air flow is greater than the second passage air flow, and the cooling degree estimator estimates the second cooling degree to be smaller than the first cooling degree when the first passage air flow is less than the second passage air flow.

3. The air-conditioning system according to claim 1, further comprising:
    a flow control device for starting and stopping a refrigerant supply to the cooling heat exchanger; and
    a flow control device controller for causing the flow control device to stop the refrigerant supply when one of the first cooling degree and the second cooling degree becomes greater than a predetermined temperature at which frosting of the cooling heat exchanger occurs.

4. The air-conditioning system according to claim 3, further comprising:
    a compressor for compressing refrigerant; and
    a compressor drive device for driving the compressor, wherein the flow control device includes an electromagnetic clutch located between the compressor and the compressor drive device.

5. The air-conditioning system according to claim 1, further comprising:
    a heating heat exchanger, disposed downstream from the cooling heat exchanger in the first and second passages, for heating air having passed through the cooling heat exchanger;
    a first temperature adjusting member for adjusting a temperature of air blown from the first passage by adjusting a first amount of heating effected by the heating heat exchanger in the first passage;
    a first target temperature calculator for calculating a first target temperature of air blown from the first passage;
    a first temperature controller for controlling the first temperature adjusting member based on at least the first target temperature and the first cooling degree;
    a second temperature adjusting member for adjusting a temperature of air blown from the second passage by adjusting a second amount of heating effected by the heating heat exchanger in the second passage;
    a second target temperature calculator for calculating a second target temperature of air blown from the second passage; and a second temperature controller for controlling the second temperature adjusting member based on at least the second target temperature and the second cooling degree.

6. The air-conditioning system according to claim 1, wherein the estimator estimates the second cooling degree based on a difference between an intake air temperature of air flowing into the cooling heat exchanger and the first cooling degree.

7. The air-conditioning system according to claim 6, wherein a ventilation mode can be independently set for each of the first air-conditioning zone and the second air-conditioning zone so that blowout areas into which conditioned air is blown in the first air-conditioning zone and in the second air-conditioning zone are different, and the first and second air flows are calculated and corrected in correspondence with the ventilation modes of the first and second air-conditioning zones, respectively.

8. The air-conditioning system according to claim 1, further comprising:
   a blower, driven by a single electric motor, for producing conditioned air blown into the first and second passages;
   a first flow determining device for determining a first target flow of conditioned air blown into the first passage;
   a second flow determining device for determining a second target flow of conditioned air blown into the second passage;
   a flow ratio control member for distributing the conditioned air produced by the blower into the first passage and the second passage and controlling a flow ratio of the air flows entering the first and second passages;
   wherein the flow control mechanism controls the blower and the flow ratio control member to realize the first and second target flows.

9. The air-conditioning system according to claim 1, wherein the flow control mechanism controls the flow rate of air in the first and second air passages in such a manner that a difference between an air amount passing through the first air passage and an air amount passing through the second air passage becomes smaller when any one of the first cooling degree and the second cooling degree is lower than a predetermined value.

10. The air-conditioning system according to claim 1, wherein the first air passage and the second air passage are formed at least from a direct downstream side of the cooling heat exchanger toward a downstream side of the housing.

11. An air-conditioning system, comprising:
   a housing having first and second passages through which conditioned air is blown into first and second air-conditioning zones, respectively;
   a heat exchanger, disposed in both the first and second passages, for cooling air passing therethrough;
   a detector, disposed in the first passage downstream of the cooling heat exchanger, for detecting a first cooling degree to which air is cooled by the heat exchanger; and
   a controller programmed to estimate a second cooling degree to which air is cooled by the heat exchanger in the second passage, based on at least a first air flow blown through the first passage, a second air flow blown through the second passage, and the first cooling degree.

12. The air-conditioning system according to claim 11, further comprising a flow control device controlled by the controller for selectively stopping a refrigerant flow to the cooling heat exchanger when one of the first cooling degree and the second cooling degree becomes greater than a predetermined cooling degree at which frosting of the cooling heat exchanger occurs.

13. The air-conditioning system according to claim 11, wherein the controller is further for estimating the second cooling degree based on a calculated difference between an intake air temperature and the first cooling degree.

14. The air-conditioning system according to claim 11, wherein the first air passage and the second air passage are formed at least from a direct downstream side of the cooling heat exchanger toward a downstream side of the housing.

15. A method for controlling operation of an air conditioner with first and second air passages and left/right temperature control, comprising the steps of:
   determining first and second target blowout temperatures for first and second blowout zones, respectively;
   calculating first and second target blowout air flow rates for the first and second blowout zones, respectively;
   sensing a first air cooling degree in a first air conditioner passage; and
   estimating a second air cooling degree in a second air conditioner passage based on results of the steps of determining, calculating, and sensing; and
   controlling the first and second blowout flow rates based on the first and second air cooling degrees.

16. The method of claim 15, wherein the step of calculating first and second target blowout air flow rates comprises calculating first and second blower voltages; and
   controlling air flow rates in the first and second air conditioner passages based on a ratio of the calculated first blowout voltage to the calculated second blowout voltage.

17. The method of claim 15, further comprising cooling air flowing in each of the first and second air conditioner passages based on the steps of determining and calculating; and
   inhibiting the step of cooling when one of the first and second cooling degrees is below a predetermined frosting temperature.

18. The method of claim 15, wherein the step of estimating comprises estimating the second cooling degree based on a difference between an intake air temperature and the first cooling degree.

19. The method of claim 15, wherein the step of estimating comprises:
   estimating the second cooling degree to be greater than the first cooling degree when air flow through the second air passage is greater than air flow through the first air passage; and
   estimating the second cooling degree to be less than the first cooling degree when the air flow through the second air passage is less than the air flow through the first air passage.

20. An air-conditioning system for a vehicle having a passenger compartment, the air-conditioning system comprising:
   a housing having first and second passages through which conditioned air is blown into first and second air-conditioning zones of the passenger compartment, respectively;
   a cooling heat exchanger, disposed in both the first and second passages, for cooling air passing therethrough;
   a flow control member for controlling a flow rate of air in the first and second passages;

a first cooling degree detector, disposed in the first passage downstream from the cooling heat exchanger, for detecting a first cooling degree of air in the first air passage;

a second cooling degree detector, disposed in the second passage downstream from the cooling heat exchanger, for detecting a second cooling degree of air in the second air passage; and a control unit for controlling air blown into the passenger compartment, wherein the control unit controls the flow control member in such a manner that a difference between an air amount passing through the first air passage and an air amount passing through the second air passage becomes smaller when any one of the first cooling degree and the second cooling degree is lower than a predetermined value.

21. The air-conditioning system according to claim 20, wherein the control unit reduces cooling capacity of the cooling heat exchanger when any one of the first cooling degree and the second cooling degree is lower than a predetermined value.

22. The air-conditioning system according to claim 20, wherein the flow control member includes a blower for generating an air flow in the first air passage and the second air passage, and a flow control door for adjusting an opening degree of the first air passage and an opening degree of the second air passage.

23. The air-conditioning system according to claim 20, wherein the flow control member includes a blower for generating an air flow in the first air passage and the second air passage, a first flow control door for adjusting an opening degree of the first air passage and a second flow control door for adjusting an opening degree of the second air passage.

24. The air-conditioning system according to claim 20, wherein the flow control member includes a first blower for adjusting an amount of air flowing through the first air passage, and a second blower for adjusting an amount of air flowing through the second air passage.

25. The air-conditioning system according to claim 20, wherein the control unit controls the flow control member in such a manner that an air amount passing through one air passage where the cooling heat exchanger is possible to be frosted, between the first and second air passages, is corrected to be increased.

26. The air-conditioning system according to claim 20, wherein:

the control unit includes frosting determination means for determining a frosting of the cooling heat exchanger; and the control unit controls the flow control member in such a manner that an air amount passing through the second air passage is corrected to be decreased when the frosting determination means determines that the cooling heat exchanger is possible to be frosted in the first air passage.

27. The air-conditioning system according to claim 20, wherein the first air passage and the second air passage are formed at least from a direct downstream side of the cooling heat exchanger toward a downstream side of the housing.

28. An air-conditioning system for a vehicle having a passenger compartment, the air-conditioning system comprising:

a housing having first and second passages through which conditioned air is blown into first and second air-conditioning zones of the passenger compartment, respectively;

a cooling heat exchanger, disposed in both the first and second passages, for cooling air passing therethrough;

a flow control member for controlling a flow rate of air in the first and second passages;

a first cooling degree detector, disposed in the first passage downstream from the cooling heat exchanger, for detecting a first cooling degree of air in the first air passage;

a second cooling degree detector, disposed in the second passage downstream from the cooling heat exchanger, for detecting a second cooling degree of air in the second air passage; and a control unit for controlling air blown into the passenger compartment, wherein the control unit controls the flow control member in such a manner that a difference between an air amount passing through the first air passage and an air amount passing through the second air passage becomes smaller when any one of the first cooling degree and the second cooling degree is lower than a predetermined value, as compared with a case where both of the first cooling degree and the second cooling degree are lower than the predetermined value.

29. The air-conditioning system according to claim 28, wherein the first air passage and the second air passage are formed at least from a direct downstream side of the cooling heat exchanger toward a downstream side of the housing.

* * * * *